(12) United States Patent
Horita

(10) Patent No.: US 8,619,324 B2
(45) Date of Patent: Dec. 31, 2013

(54) COLOR CONVERTING METHOD, COLOR CONVERTING APPARATUS, AND RECORDING MEDIUM

(75) Inventor: Shuhei Horita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 264 days.

(21) Appl. No.: 13/039,848

(22) Filed: Mar. 3, 2011

(65) Prior Publication Data

US 2011/0216335 A1 Sep. 8, 2011

(30) Foreign Application Priority Data

Mar. 5, 2010 (JP) ................................. 2010-049180

(51) Int. Cl.
*H04N 1/60* (2006.01)
*G03G 13/01* (2006.01)
*B41J 3/00* (2006.01)

(52) U.S. Cl.
USPC ................................. 358/1.9; 430/47.5; 347/4

(58) Field of Classification Search
USPC ................................. 358/1.9; 430/47.5; 347/4
See application file for complete search history.

(56) References Cited

U.S. PATENT DOCUMENTS

| 2002/0180996 A1* | 12/2002 | Allen et al. ..................... 358/1.9 |
| 2007/0058186 A1 | 3/2007 | Tanaka |
| 2007/0287082 A1* | 12/2007 | Ng .............................. 430/47.5 |

FOREIGN PATENT DOCUMENTS

| JP | 7-154623 A | 6/1995 |
| JP | 2002-218266 A | 8/2002 |
| JP | 2004-153554 A | 5/2004 |
| JP | 2004297390 A | 10/2004 |
| JP | 2006311257 A | 11/2006 |
| JP | 2007081586 A | 3/2007 |

OTHER PUBLICATIONS

Yukio Murata, "Basic and Applied Technologies of Color Representation", 18 pages including a partial English translation of pp. 88-89 with Equations (21) and 22, (Triceps), Sep. 20, 1990.
Paul Kubelka, "New Contributions to the Optics of Intensely Light-Scattering Materials. Part I", Journal of the Optical Society of America, May 1948, pp. 448-457, vol. 38, No. 5.
Toshiharu Enomae, "Paper Properties and Their Evaluation Methods with Latest Relevant Testing Standards", Journal of Japan Image Society 150, 2004, Total 17 Pages.
Yukio Murata, "Basic and Applied Technologies of Color Representation", pp. 88-89, Equation (21) (Triceps).
Rejection of the Application, dated Mar. 19, 2013, issued in corresponding JP Application No. 2010-049180, 7 pages in English and Japanese.

* cited by examiner

*Primary Examiner* — Miya J Cato
*Assistant Examiner* — Temitayo Folayan
(74) *Attorney, Agent, or Firm* — Sughrue Mion, PLLC

(57) ABSTRACT

A first profile corresponding to a first print is generated based on first spectral data of a first print and third spectral data of a light source, which serves as an observational light source for the first print. A second profile corresponding to a second protective-film-covered print is generated based on spectral data of a second print, second spectral data of a second laminating film, and third spectral data of a light source, which serves as an observational light source for the second protective-film-covered print. Using the first profile as an input profile and the second profile as an output profile, colors of image data representing an image of the first print are converted into colors of image data representing an image of the second print.

28 Claims, 12 Drawing Sheets

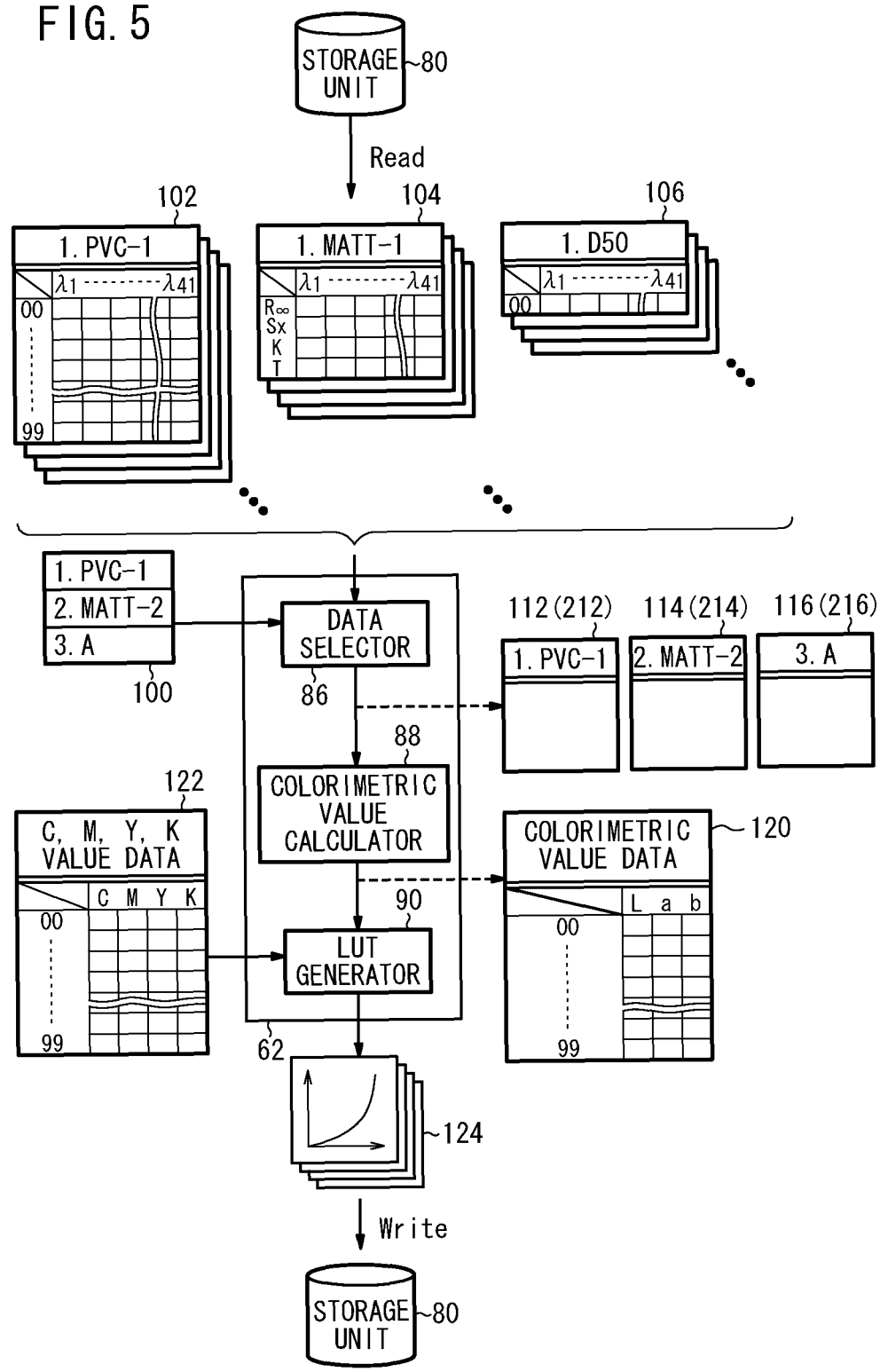

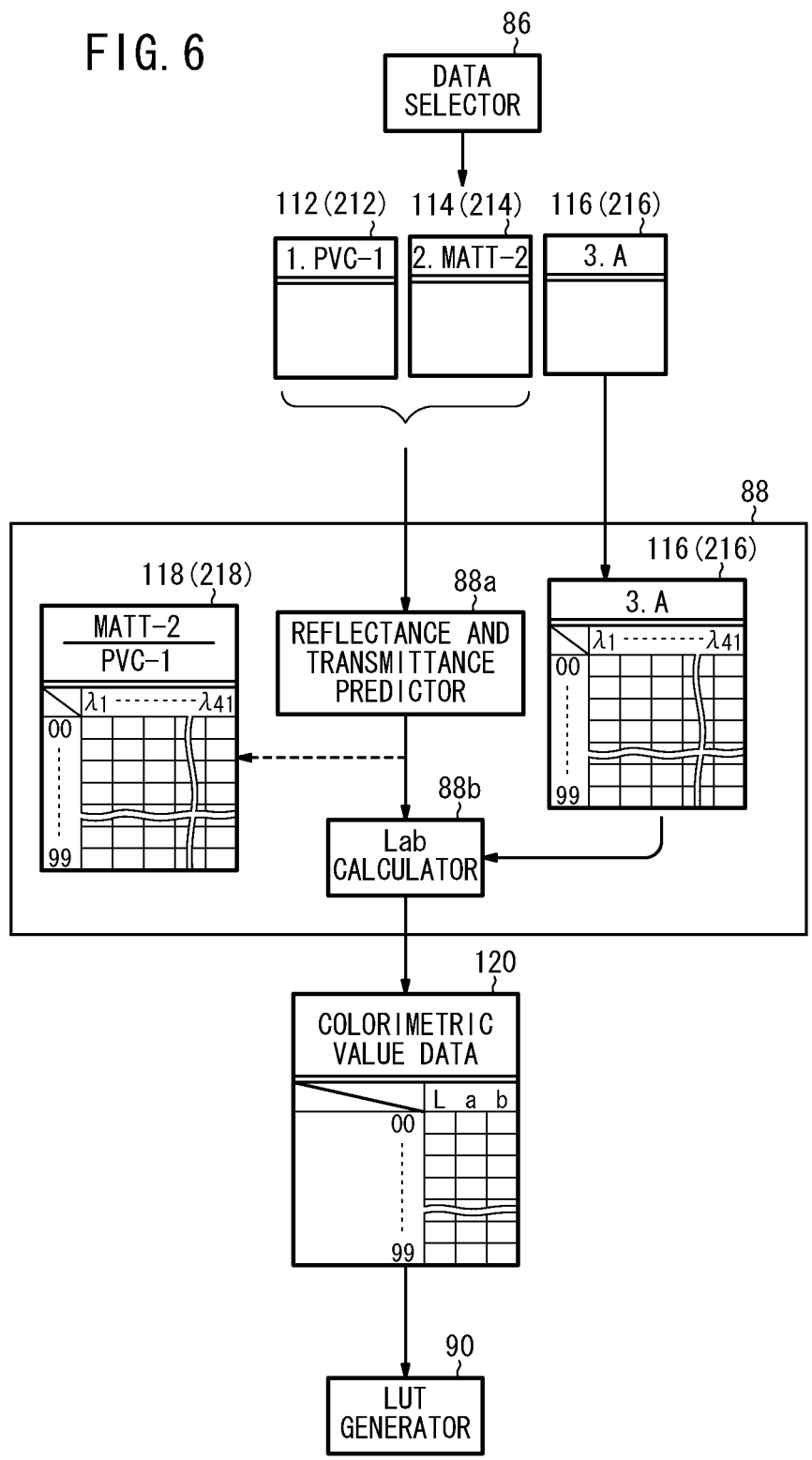

FIG. 7

```
┌─────────────────────────────────────────────────────────┐
│  SETTING OF COLOR CONVERSION PROCESSING CONDITIONS      │
│              PRINTING SPOT         DISPLAY SPOT         │
│   MEDIUM     [ PVC(A) ▽]–132      [ PVC(B) ▽]–138      │
│   LAMINATING [ NONE   ▽]–134      [ GLOSS B ▽]–140     │
│   LIGHT SOURCE[ D50   ▽]–136      [ F8     ▽]–142      │
│  ─────────────────────────────────────────────────────  │
│   IMAGE FILE NAME                                       │
│       ORIGINAL IMAGE            CONVERTED IMAGE         │
│       [OrgImage.pdf][OPEN]      [NewImage.pdf][OPEN]    │
│            144a     144b             146a     146b      │
│                        148–☑ BLACK POINT CORRECTION     │
│                              [ CONVERT ]  [ CANCEL ]    │
│                                  150         152        │
└─────────────────────────────────────────────────────────┘
                                                    130
```

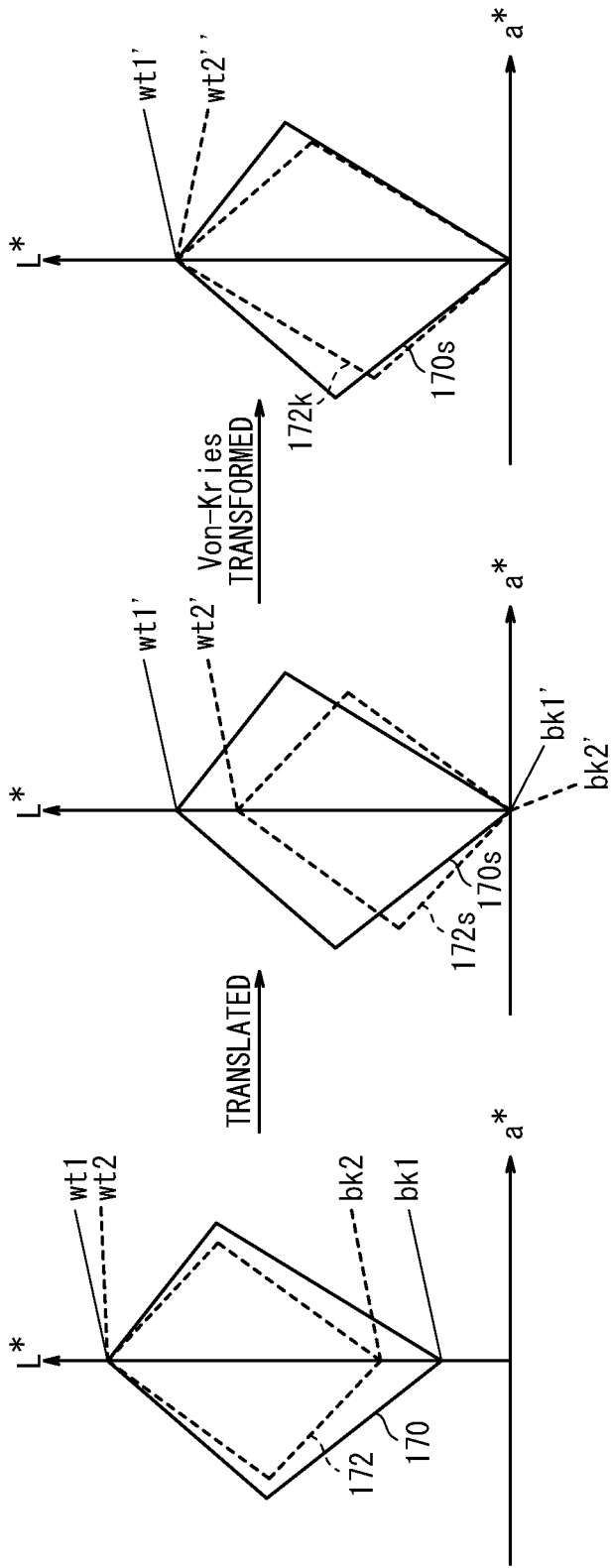

FIG. 12A

SETTING OF COLOR CONVERSION PROCESSING CONDITIONS — 130

|  | PRINTING SPOT | DISPLAY SPOT |
|---|---|---|
| MEDIUM | PVC(A) ▽ — 132 | PVC(B) ▽ — 138 |
| LAMINATING | NONE ▽ — 134 | NONE ▽ — 140 |
| LIGHT SOURCE | D50 ▽ — 136 | F8 ▽ — 142 |

IMAGE FILE NAME

ORIGINAL IMAGE: [OrgImage.pdf] [OPEN]
144a   144b

CONVERTED IMAGE: [NewImage.pdf] [OPEN]
146a   146b

180

[CONVERT] [CANCEL]
  150       152

FIG. 12B

SETTING OF COLOR CONVERSION PROCESSING CONDITIONS — 130

|  | PRINTING SPOT | DISPLAY SPOT |
|---|---|---|
| MEDIUM | PVC(A) ▽ — 132 | PVC(B) ▽ — 138 |
| LAMINATING | NONE ▽ — 134 | NONE ▽ — 140 |
| LIGHT SOURCE | D50 ▽ — 136 | F8 ▽ — 142 |

IMAGE FILE NAME

ORIGINAL IMAGE: [OrgImage.pdf] [OPEN]
144a   144b

CONVERTED IMAGE: [NewImage.pdf] [OPEN]
146a   146b

182 — ☒ BLACK POINT CORRECTION

[CONVERT] [CANCEL]
  150       152

COLOR CONVERTING METHOD, COLOR CONVERTING APPARATUS, AND RECORDING MEDIUM

CROSS-REFERENCE TO RELATED APPLICATION

This application is based upon and claims the benefit of priority from Japanese Patent Application No. 2010-049180 filed on Mar. 5, 2010, of which the contents are incorporated herein by reference.

BACKGROUND OF THE INVENTION

1. Field of the Invention

The present invention relates to a color converting method, a color converting apparatus, and a recording medium storing program for converting image data for producing an image of appropriate colors on a first print into image data for producing an image of appropriate colors on a second print.

2. Description of the Related Art

With significant advances in inkjet technology in recent years, it has become possible for inkjet printers to produce large color prints of high quality at high speeds. Inkjet printers are not only popular for private or home use, but also are widely used in commercial applications nowadays. Inkjet printers make it possible to print on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums such as synthetic paper known as YUPO, thick paper, aluminum-evaporated paper, etc., resin mediums such as vinyl chloride, PET, etc., and tarpaulin paper made of woven fiber cloth with synthetic resin films applied to both surfaces thereof.

Since advertisement prints are expected to be effective to arouse consumer's motivation to buy advertised products through the consumer's visual sensation, the finish of the colors of the prints is of particular importance. Heretofore, there have been disclosed various color matching technologies, such as a method of generating an ICC (International Color Consortium) profile, a method of adjusting designated colors, etc., as means for print color managing.

Advertisement prints are displayed in a variety of places including outdoor areas, indoor areas, and spotlighted exhibition sites. Generally, the spectral characteristics (spectral energy distribution) of environmental light as an observational light source for prints vary depending on different places where the prints are displayed.

If different observational light sources are used with a print, then since the spectral characteristics of lights that are emitted from different observational light sources and which ultimately reach the retina of a human observer are different, the appearance (color impression) of the print that is visually perceived by the observer tends to vary depending on the observational light sources, although this tendency may differ from observer to observer. As a consequence, if the observational environment in which a print is produced, i.e., the location where the printer is installed, and the observational environment in which the print is displayed differ greatly from each other, then the print may possibly fail to exhibit desired colors.

Japanese Laid-Open Patent Publication No. 2002-218266 discloses an apparatus and method for acquiring light source characteristics of an environment in which an image is observed, and for performing a color matching process in view of chromatic adaptation to environmental light (see paragraphs [0008] through [0012] of Japanese Laid-Open Patent Publication No. 2002-218266).

Japanese Laid-Open Patent Publication No. 07-154623 discloses a system for combining a plurality of profiles of different data attributes into profiles for input and output devices. For example, parameters concerning a paper (see paragraph [0047] and FIG. 4 of Japanese Laid-Open Patent Publication No. 07-154623) are set as a print output condition profile, and parameters concerning an observational light source (see paragraph [0049] and FIG. 6 of the publication) are set as an observational condition profile. Image data can easily be processed depending on the type of observational light source and the type of medium used (see paragraph [0086] of the publication).

SUMMARY OF THE INVENTION

The present invention has been achieved in relation to the technical concepts disclosed in Japanese Laid-Open Patent Publication No. 2002-218266 and Japanese Laid-Open Patent Publication No. 07-154623.

It is an object of the present invention to provide a color converting method, a color converting apparatus, and a recording medium storing a program for converting image data into image data suitable for printing conditions and an observational environment, without the need for implementing a color adjusting process each time that printing conditions and the observational environment are changed.

According to a first aspect of the present invention, there is provided a color converting method comprising a first acquiring step of acquiring an optical property value of a first print printed on a first medium and an optical property value of a second print printed on a second medium, which is either the same as or different from the first medium, a second acquiring step of acquiring an optical property value of a second protective film that covers the second print, a third acquiring step of acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film, a first generating step of generating a first profile corresponding to the first print based on the acquired optical property value of the first print and the acquired spectral distribution of the first light source, a second generating step of generating a second profile corresponding to the second protective-film-covered print based on the acquired optical property value of the second print, the acquired optical property value of the second protective film, and the acquired spectral distribution of the second light source, and a color converting step for converting colors of image data representing an image of the first print into colors of image data representing an image of the second print, using the generated first profile as an input profile and the generated second profile as an output profile.

Since the first profile, which is suitable for the first print, is used as an input profile, and the second profile suitable for the second protective-film-covered print is used as an output profile, color reproduction of the second protective-film-covered print, depending on various printing conditions and observational modes, can appropriately be carried out directly using the color image data suitable for printing the first print. Consequently, fine color adjustments do not need to be performed each time that combinations of printing conditions and observational modes are changed, and the number of man-hours required for such fine color adjustments can be greatly reduced.

In the first aspect of the present invention, the first acquiring step preferably further comprises the steps of designating types of mediums, and acquiring the optical property values corresponding to the designated types of mediums by referring to a database or by colorimetrically measuring the prints.

In the first aspect of the present invention, the second acquiring step preferably further comprises the steps of designating a type of protective film, and acquiring the optical property value corresponding to the designated type of protective film by referring to a database or by measuring the protective film.

In the first aspect of the present invention, the third acquiring step preferably further comprises the steps of designating types of light sources, and acquiring the spectral distributions corresponding to the designated types of light sources by referring to a database or by measuring the light sources.

In the first aspect of the present invention, the color converting step preferably further comprises the step of mapping a color value of a black point with respect to the first profile onto a color value of a black point with respect to the second profile.

In the first aspect of the present invention, if the mediums comprise reflective mediums, then the optical property values of the prints preferably comprise spectral reflectances, and the optical property values of the protective films preferably comprise two independent optical property values among an inherent reflectance, a scattering coefficient, and an absorption coefficient at each light wavelength of the protective films.

In the first aspect of the present invention, if the mediums comprise transmissive mediums, then the optical property values of the prints and the optical property values of the protective films preferably comprise spectral transmittances.

According to a second aspect of the present invention, there is also provided a color converting method comprising a first acquiring step of acquiring an optical property value of a first print printed on a first medium and an optical property value of a second print printed on a second medium, which is either the same as or different from the first medium, a second acquiring step of acquiring an optical property value of a first protective film that covers the first print and an optical property value of a second protective film that covers the second print, the second protective film being either the same as or different from the first protective film, a third acquiring step of acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film, a first generating step of generating a first profile corresponding to the first protective-film-covered print based on the acquired optical property value of the first print, the acquired optical property value of the first protective film, and the acquired spectral distribution of the first light source, a second generating step of generating a second profile corresponding to the second protective-film-covered print based on the acquired optical property value of the second print, the acquired optical property value of the second protective film, and the acquired spectral distribution of the second light source, and a color converting step of converting colors of image data representing an image of the first print into colors of image data representing an image of the second print, using the generated first profile as an input profile and the generated second profile as an output profile.

Since the first profile, which is suitable for the first protective-film-covered print, is used as an input profile, and the second profile suitable for the second protective-film-covered print is used as an output profile, color reproduction of the second protective-film-covered print, depending on various printing conditions and observational modes, can appropriately be carried out directly using the color image data suitable for printing the first protective-film-covered print.

In the second aspect of the present invention, the second print preferably is not covered with the protective film. Further, the second acquiring step preferably acquires the optical property value of the first protective film that covers the first print, the third acquiring step preferably acquires the spectral distribution of the first light source, which serves as the observational light source for the first protective-film-covered print produced by covering the first print with the first protective film, and the spectral distribution of the second light source, which serves as the observational light source for the second protective-film-covered print, and the second generating step preferably generates the second profile corresponding to the second print based on the acquired optical property value of the second print and the acquired spectral distribution of the second light source.

In the second aspect of the present invention, the first acquiring step preferably further comprises the steps of designating types of mediums, and acquiring the optical property values corresponding to the designated types of mediums by referring to a database or by colorimetrically measuring the prints.

In the second aspect of the present invention, the second acquiring step preferably further comprises the steps of designating types of protective films, and acquiring the optical property values corresponding to the designated types of protective films by referring to a database or by measuring the protective films.

In the second aspect of the present invention, the third acquiring step preferably further comprises the steps of designating types of light sources, and acquiring the spectral distributions corresponding to the designated types of light sources by referring to a database or by measuring the light sources.

In the second aspect of the present invention, the color converting step preferably further comprises the step of mapping a color value of a black point with respect to the first profile onto a color value of a black point with respect to the second profile.

In the second aspect of the present invention, the color converting method preferably further comprises the steps of displaying an image according to a GUI, designating a type of the first protective film or the second protective film based on a user operation according to the GUI, and changing the image according to the GUI, so as to disable a selection as to whether to carry out the mapping step if the type of the first protective film or the second protective film is designated as not covering a print, and to enable a selection as to whether to carry out the mapping step if the type of the first protective film or the second protective film is designated otherwise.

In the second aspect of the present invention, if the mediums comprise reflective mediums, then the optical property values of the prints preferably comprise spectral reflectances, and the optical property values of the protective films preferably comprise two independent optical property values among an inherent reflectance, a scattering coefficient, and an absorption coefficient at each light wavelength of the protective films.

In the second aspect of the present invention, if the mediums comprise transmissive mediums, then the optical property values of the prints and the optical property values of the protective films preferably comprise spectral transmittances.

According to a third aspect of the present invention, there is also provided a color converting apparatus comprising a first acquirer for acquiring an optical property value of a first print printed on a first medium and an optical property value of a second print printed on a second medium, which is either the same as or different from the first medium, a second acquirer for acquiring an optical property value of a second protective film that covers the second print, a third acquirer for acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film, a profile generator for generating a first profile corresponding to the first print based on the optical property value of the first print acquired by the first acquirer and the spectral distribution of the first light source acquired by the third acquirer, and generating a second profile corresponding to the second protective-film-covered print based on the optical property value of the second print acquired by the first acquirer, the optical property value of the second, protective film acquired by the second acquirer, and the spectral distribution of the second light source acquired by the third acquirer, and a color converter for converting colors of image data representing an image of the first print into colors of image data representing an image of the second print, using the first profile generated by the profile generator as an input profile and the second profile generated by the profile generator as an output profile.

According to a fourth aspect of the present invention, there is also provided a color converting apparatus comprising a first acquirer for acquiring an optical property value of a first print printed on a first medium and an optical property value of a second print printed on a second medium, which is either the same as or different from the first medium, a second acquirer for acquiring an optical property value of a first protective film that covers the first print and an optical property value of a second protective film that covers the second print, the second protective film being either the same as or different from the first protective film, a third acquirer for acquiring a spectral distribution of a first right source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film, a profile generator for generating a first profile corresponding to the first protective-film-covered print based on the optical property value of the first print acquired by the first acquirer, the optical property value of the first protective film acquired by the second acquirer, and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer, and a color converter for converting colors of image data representing an image of the first print into colors of image data representing an image of the second print, using the first profile generated by the profile generator as an input profile and the second profile generated by the profile generator as an output profile.

According to a fifth aspect of the present invention, there is also provided a recording medium storing therein a program to be executed by a computer, the program enabling the computer to function as a first acquirer for acquiring an optical property value of a first print printed on a first medium and an optical property value of a second print printed on a second medium, which is either the same as or different from the first medium, a second acquirer for acquiring an optical property value of a second protective film that covers the second print, a third acquirer for acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film, a profile generator for generating a first profile corresponding to the first print based on the optical property value of the first print acquired by the first acquirer and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer, and a color converter for converting colors of image data representing an image of the first print into colors of image data representing an image of the second print, using the first profile generated by the profile generator as an input profile and the second profile generated by the profile generator as an output profile.

According to a sixth aspect of the present invention, there is also provided a recording medium storing therein a program to be executed by a computer, the program enabling the computer to function as a first acquirer for acquiring an optical property value of a first print printed on a first medium and an optical property value of a second print printed on a second medium, which is either the same as or different from the first medium, a second acquirer for acquiring an optical property value of a first protective film that covers the first print and an optical property value of a second protective film that covers the second print, the second protective film being either the same as or different from the first protective film, a third acquirer for acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film, a profile generator for generating a first profile corresponding to the first protective-film-covered print based on the optical property value of the first print acquired by the first acquirer, the optical property value of the first protective film acquired by the second acquirer, and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer, and a color converter for converting colors of image data representing an image of the first print into colors of image data representing an image of the second print, using the first profile generated by the profile generator as an input profile and the second profile generated by the profile generator as an output profile.

With the color converting method, the color converting apparatus, and the recording medium storing the program therein according to the present invention, the first profile corresponding to the first print, or the first protective-film-covered print if the first print is covered with the first protective film, is generated based on the acquired optical property value of the first print, the acquired optical property value of the first protective film only if the first print is covered with the first protective film, and the acquired spectral distribution of the first light source. Further, the second profile corresponding to the second protective-film-covered print is generated based on the acquired optical property value of the second print, the acquired optical property value of the second protective film, and the acquired spectral distribution of the second light source. Using the generated first profile as an input profile and the generated second profile as an output profile, colors of image data representing the image of the first print are converted into colors of image data representing the image of the second print. Therefore, color reproduction of the second protective-film-covered print, depending on various printing color reproducing conditions, can appropriately be carried out directly using the color image data suitable for printing the first print, or the first protective-film-covered print if the first print is covered with the first protective film. Consequently, fine color adjustments do not need to be performed each time that combinations of printing conditions and observational modes are changed. Hence, the number of man-hours required for such fine color adjustments can be greatly reduced.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a functional block diagram of a profile generator shown in FIG. 4;

FIG. 6 is a functional block diagram of a colorimetric value calculator shown in FIG. 5;

FIG. 7 is a view showing by way of example a setting image for setting color conversion processing conditions;

FIGS. 11A through 11C are diagrams showing a gamut converting process by way of black point correction; and FIGS. 12A and 12B are views showing how the displayed state of black point correction changes, depending on the setting of a type of a laminating film.

DESCRIPTION OF THE PREFERRED EMBODIMENTS

A color converting method according to a preferred embodiment of the present invention, in relation to a color converting apparatus that carries out the color converting method, and a printing system incorporating the color converting apparatus therein, will be described in detail below with reference to the accompanying drawings.

Figure 1:
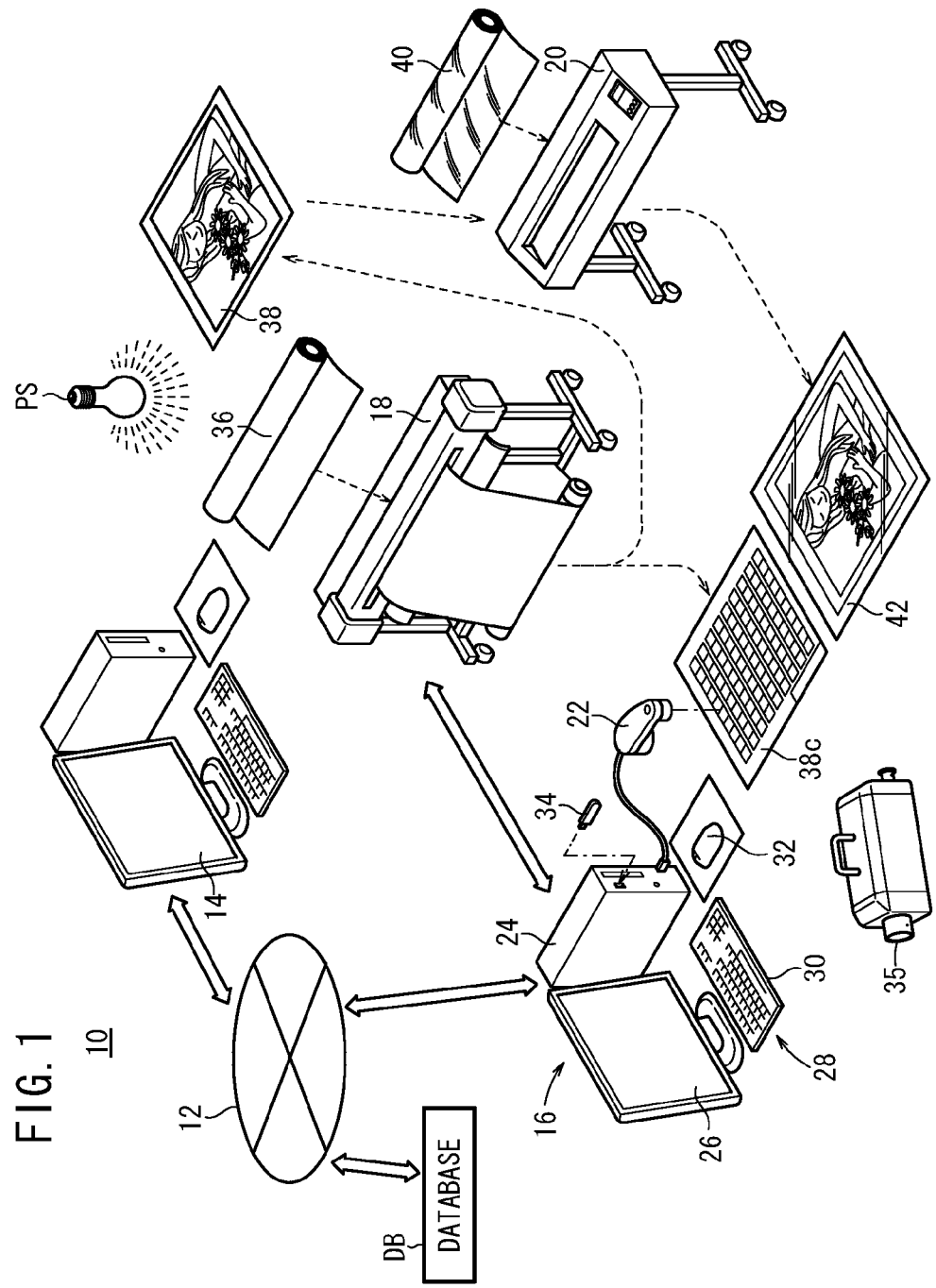
FIG. 1 is a perspective view of a printing system incorporating therein a color converting apparatus according to an embodiment of the present invention.

FIG. 1 shows in perspective a printing system 10 incorporating therein an image processing apparatus 16 as a color converting apparatus according to an embodiment of the present invention.

As shown in FIG. 1, the printing system 10 basically comprises a LAN 12, an editing apparatus 14, an image processing apparatus 16 that serves as a color converting apparatus, a printing machine 18, a laminating apparatus 20, and a colorimeter 22 that serves as first and second acquirers.

The LAN 12 comprises a network constructed according to communication standards such as Ethernet (registered trademark) or the like. The editing apparatus 14, the image processing apparatus 16, and a database DB are connected to each other by a wired or wireless link through the LAN 12.

The editing apparatus 14 is capable of editing the arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels made up of four colors (C, M, Y, K) or three colors (R, G, B).

PDL refers to a language that is descriptive of image information, including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems Inc., and XPS (XML Paper Specification).

A color scanner, not shown, is connected to the editing apparatus 14. The color scanner is capable of optically reading a color original set in position. Therefore, the editing apparatus 14 can acquire, as image data of an original manuscript, color image data from the color scanner based on the color original read thereby.

The image processing apparatus 16 converts color image data of an electronic manuscript described by PDL and acquired from the editing apparatus 14 into bitmap image data (a type of raster image data), performs a desired image processing operation, e.g., a color conversion process, an image scaling process, an image arranging process, etc., on the bitmap image data, converts the processed bitmap image data into print signals that match the printing process of the printing machine 18, and sends the print signals to the printing machine 18.

The image processing apparatus 16 comprises a main unit 24 including a CPU, a memory, etc., a display device 26 for displaying color images, and an input device 28 serving as an input unit including a keyboard 30 and a mouse 32. A portable memory 34, which is capable of freely recording and erasing electronic data, and the colorimeter 22 are connected to the main unit 24 of the image processing apparatus 16. The colorimeter 22 may be replaced with a contactless colorimeter 35 as a third acquirer for acquiring spectral radiation distributions of various light sources.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls propulsion of inks onto a print medium 36 (a rolled non-printed medium in FIG. 1) based on print signals received from an external apparatus, e.g., the image processing apparatus 16, instructing the external apparatus to print a color image on the print medium 36, thereby producing a print 38, which may include a color chart 38c.

The laminating apparatus 20 applies a laminating film 40 as a protective film to the image-formed surface of the print 38 and, if necessary, the reverse surface thereof, and heats and presses the laminating film 40 onto the print 38 with a heating roller, not shown, thereby producing a protective-film-covered print 42, wherein the image-formed surface of the print 38 is protected by the laminating film 40.

The print medium 36 may comprise a paper medium such as a synthetic paper, thick paper, aluminum-evaporated paper, or the like, or a resin medium such as vinyl chloride, PET, or the like, or tarpaulin paper, or the like. The protective film applied to the print 38 is not limited to a laminating film 40, but may be formed from a liquid, a varnish, a transparent ink, a clear toner, or the like, or may comprise a protective sheet such as an acrylic sheet or the like.

The colorimeter 22 measures colorimetric values of the object to be measured. Colorimetric values refer not only to tristimulus values X, Y, Z, the coordinates L*, a*, b* of a uniform color space, etc., but also to a distribution of optical physical values (hereinafter referred to as "spectral data") with respect to wavelengths, e.g., a spectral radiance distribution, a spectral sensitivity distribution, spectral reflectivity, or spectral transmittance. Color values produced by a colorimetric process performed using the colorimeter 22 may sometimes be referred to as "colorimetric values."

Figure 2A:
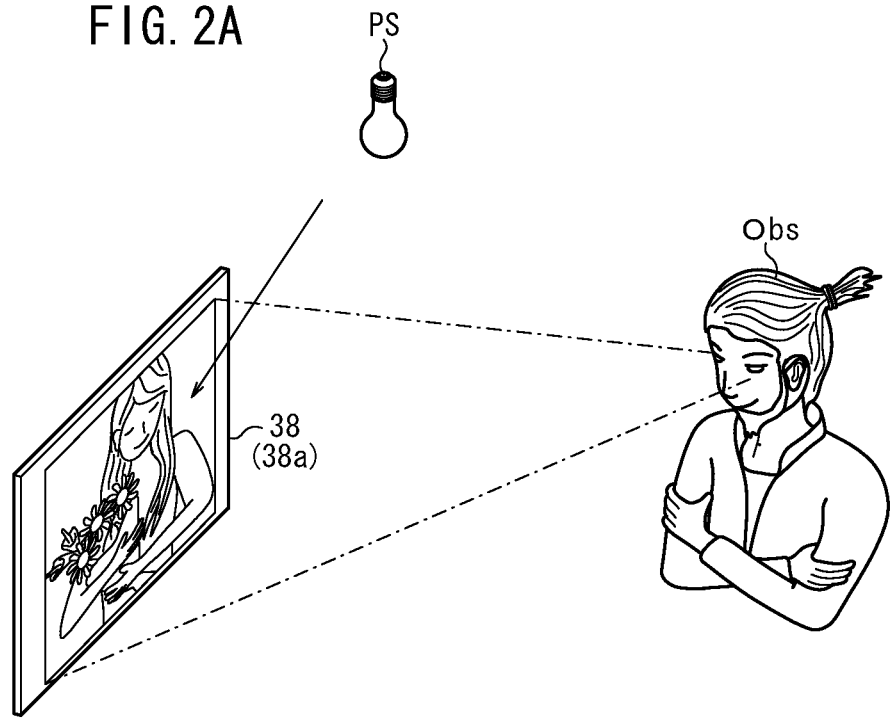
FIGS. 2A and 2B are views showing the manner in which an observer observes a print or a protective-film-covered print in a given observational spot.
Figure 2B:
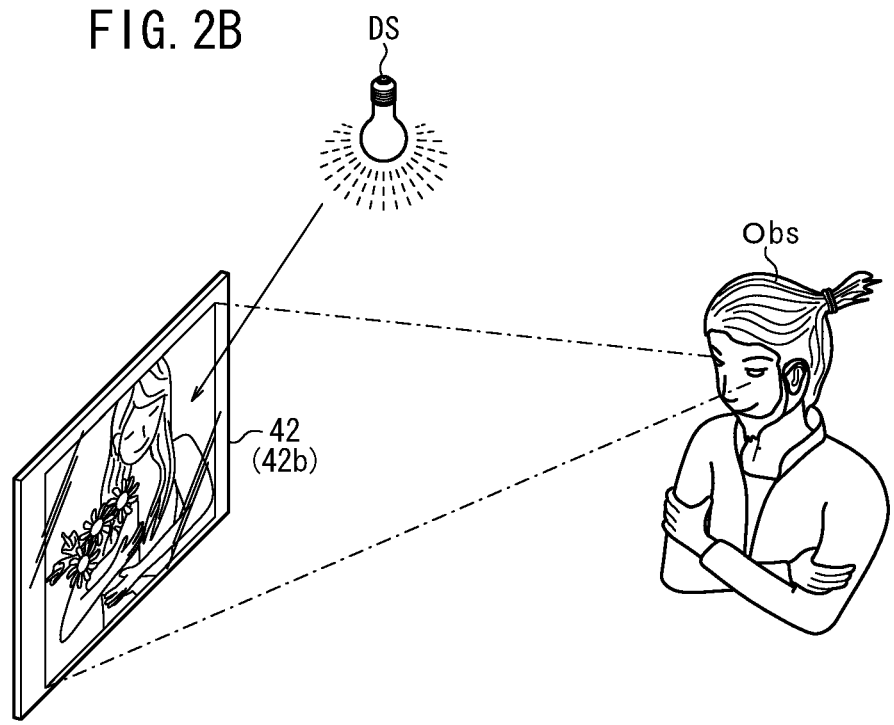

FIGS. 2A and 2B are views showing the manner in which an observer Obs observes the print 38 or the protective-film-covered print 42 in a given observational spot.

FIG. 2A shows the manner in which an observer Obs observes the print 38 under a light source PS at a printing spot where the printing system 10 is installed. Instead of observing the print 38, the observer Obs may observe the protective-film-covered print 42.

In order to indicate that the print 38 or the protective-film-covered print 42 is observed in the printing spot, the print 38 or the protective-film-covered print 42, which is adjusted in color under the light source PS shown in FIG. 2A, will be referred to as a first print 38a or a first protective-film-covered print 42a. The medium 36 and the laminating film 40 of the first protective-film-covered print 42a will be referred to as a first medium 36a and a first laminating film 40a, respectively. The first print 38a and the first protective-film-covered print 42a may collectively be referred to as a "first print 38a or the like."

FIG. 2B shows the manner in which an observer Obs observes the protective-film-covered print 42 under a light source DS at a display spot. Instead of observing the protective-film-covered print 42, the observer Obs may observe a print 38 that is not covered with the laminating film 40.

In order to indicate that the protective-film-covered print 42 or the print 38 is observed in the display spot, the protective-film-covered print 42 or the print 38, which is adjusted in color under the light source DS shown in FIG. 2B, will be referred to as a second protective-film-covered print 42b or a second print 38b. The medium 36 and the laminating film 40 of the second protective-film-covered print 42b will be referred to as a second medium 36b and a second laminating film 40b, respectively. The second print 38b and the second protective-film-covered print 42b may collectively be referred to as a "second print 38b or the like."

The light source DS in the display spot is a light source, which is the same as or different from the light source PS in the printing spot. The second medium 36b is a medium 36, which is the same as or different from the first medium 36a. The second laminating film 40b is a laminating film 40, which is the same as or different from the first laminating film 40a. The second print 38b is a print 38, which is the same as or different from the first print 38a. The second protective-film-covered print 42b is a protective-film-covered print 42, which is the same as or different from the first protective-film-covered print 42a.

Figure 3:
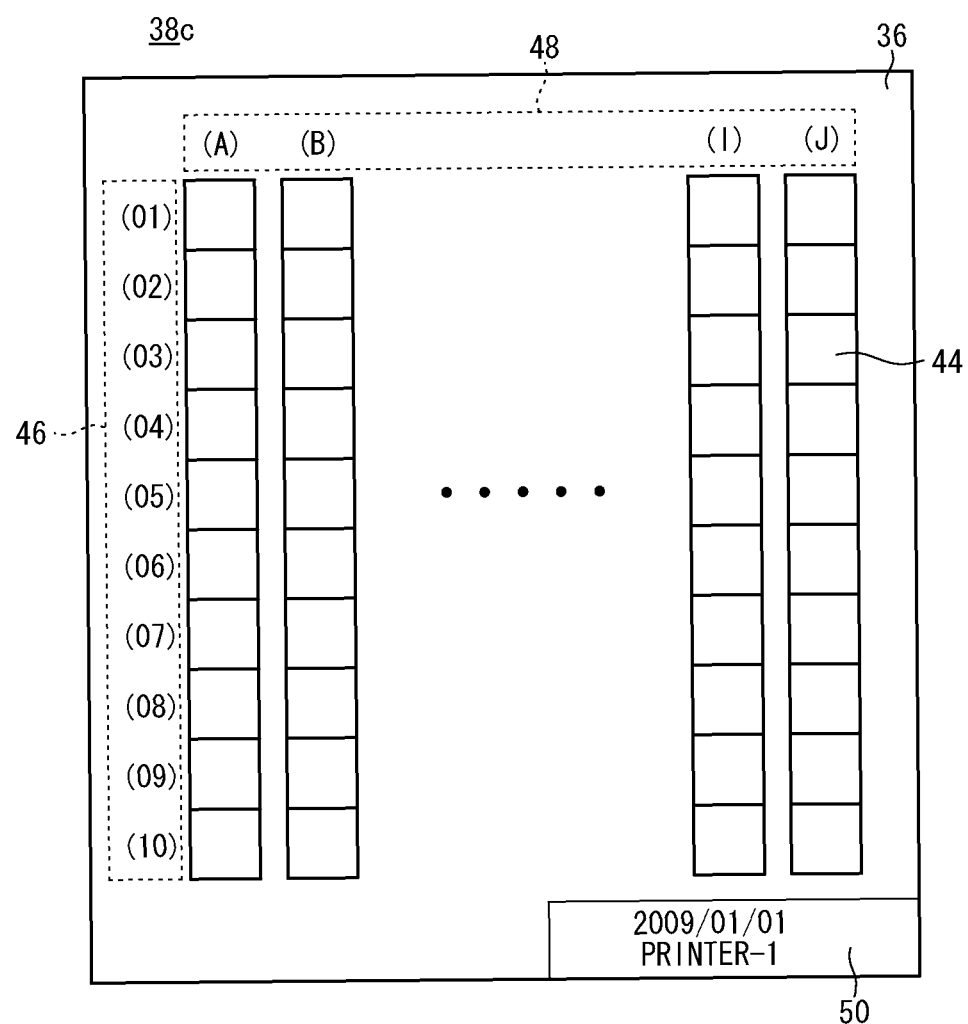
FIG. 3 is a front elevational view of a color chart shown in FIG. 1.

FIG. 3 is a front elevational view of the color chart 38c shown in FIG. 1.

The color chart 38c shown in FIG. 3 comprises one hundred color patches 44 of different colors, which are substantially identical in shape and arranged in rows and columns, a sequence of numbers 46 and a sequence of alphabetical letters 48 for identifying positions of the color patches 44 along directions of the rows and columns, and print information 50 for identifying conditions for printing the color chart 38c, all of which are printed on the print medium 36.

The color patches 44 are arranged in a matrix having ten vertical columns and ten horizontal rows, spaced from each other by given intervals. Colors of the respective color patches 44 are set to given values in a range of signal levels of C, M, Y, K values (a percentage range from 0% to 100%, or an 8-bit gradation range from 0 to 255).

The sequence of numbers 46 represents a vertical string of characters ranging from (01) to (10) positioned in alignment with and to the left of respective rows of color patches 44. The sequence of alphabetical letters 48 represents a horizontal string of characters ranging from (A) to (J) positioned in alignment with and at the top of respective columns of color patches 44.

Print information 50 is printed on the print medium 36 and represents the type and serial number or a registered name of the printing machine 18, a print mode to be described later, a type of print medium 36, a print date, etc.

Figure 4:
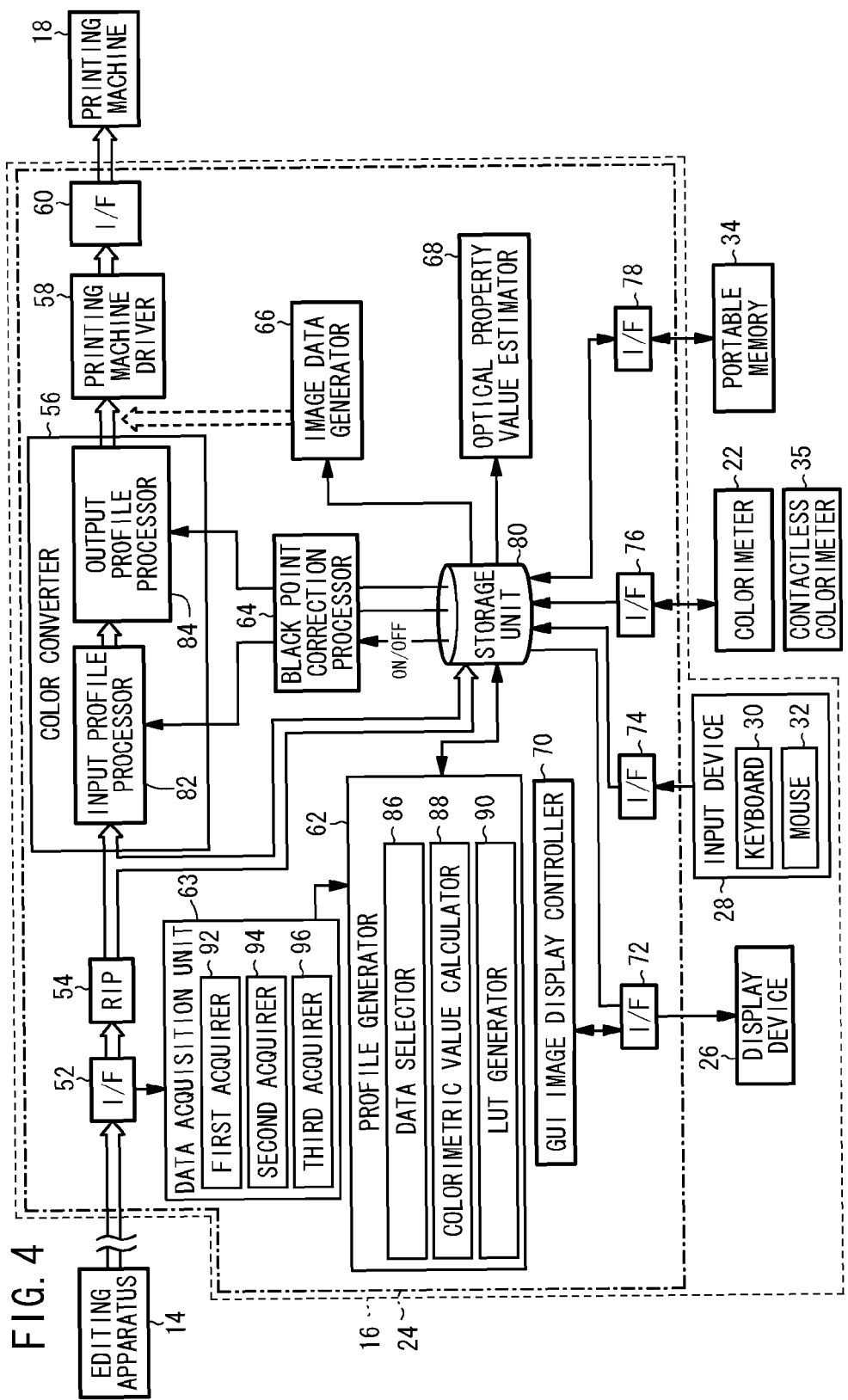
FIG. 4 is a functional block diagram of the color converting apparatus shown in FIG. 1.

FIG. 4 is a functional block diagram of the image processing apparatus 16 shown in FIG. 1. In FIG. 4, an electronic manuscript is supplied along directions indicated by the outlined solid-line arrows, color-chart image data is supplied along directions indicated by the outlined broken-line arrows, and various other data are supplied along directions indicated by the solid-line arrows.

As shown in FIG. 4, the main unit 24 of the image processing apparatus 16 includes an I/F 52 for entering an electronic manuscript supplied from the editing apparatus 14, a RIP (Raster Imaging Processor) 54 for converting the PDL format of the electronic manuscript supplied from the I/F 52 into a raster format, a color converter 56 for performing a color conversion process on the converted C, M, Y, K values (or R, G, B values) of the electronic manuscript supplied from the RIP 54 in order to produce image data of new C, M, Y, K values, a printing machine driver 58 for converting image data of new C, M, Y, K values produced by the color converter 56 into print control signals (ink propulsion control data) that match the printing process of the printing machine 18, and an I/F 60 for outputting print control signals generated by the printing machine driver 58 to the printing machine 18.

The main unit 24 also includes a profile generator 62 for generating respective profiles for different printing machines 18, a data acquisition unit 63 for acquiring optical data required to generate profiles, a black point correction processor 64 for performing black point correction, to be described later, color conversion LUTs (Look Up Tables) of the profiles, an image data generator 66 for generating image data to print the color chart 38c, an optical property value estimator 68 for estimating optical property values of the laminating film 40, a GUI image display controller 70 for displaying an operation image, i.e., the setting image 130 shown in FIG. 7, for realizing a GUI function, an I/F 72 for connection to the display device 26, an I/F 74 for connection to the input device 28 including the keyboard 30 and the mouse 32, an I/F 76 for connection to the colorimeter 22 or the contactless colorimeter 35, and an I/F 78 for connection to the portable memory 34.

The main unit 24 also includes a storage unit 80 for storing various data supplied from various components of the main unit 24, and for supplying stored data to various components of the main unit 24. The storage unit 80 is connected to the RIP 54, the color converter 56, the profile generator 62, the black point correction processor 64, the image data generator 66, the optical property value estimator 68, the I/F 72, the I/F 74, the I/F 76, and the I/F 78.

The color converter 56 comprises an input profile processor 82 for converting device-dependent data into device-independent data, and an output profile processor 84 for converting device-independent data into device-dependent data. Device-dependent data refer to data defined in terms of C, M, Y, K values, R, G, B values, or the like for appropriately driving various devices. Device-independent data refer to data defined in terms of a display system such as an HSV (Hue-Saturation-Value) system, an HLS (Hue-Lightness-Saturation) system, a CIELAB system, a CIELUV system, an XYZ system, or the like.

The data acquisition unit 63 includes a first acquirer 92 for acquiring first spectral data 112, 212 (see FIGS. 5 and 6), a second acquirer 94 for acquiring second spectral data 114, 214 (see FIGS. 5 and 6), and a third acquirer 96 for acquiring third spectral data 116, 216 (see FIGS. 5 and 6).

The RIP 54 can perform various image processing operations including an image scaling process depending on the resolution, etc., of the printing machine 18, and a rotating and inverting process depending on a printing format at a time when the electronic manuscript is converted into raster image data.

The printing machine driver 58 generates ink propulsion control data corresponding to ink colors (C, M, Y, K, LC, LM, or W) from C, M, Y, K values. Ink propulsion control data refer to data for appropriately controlling the printing machine 18 so as to eject inks (ink ejection ON/OFF, ink dot diameters, etc.). The printing machine driver 58 may generate ink propulsion control data according to a known algorithm, such as a dither matrix method, an error diffusion method, or the like, although such data needs to be converted from an 8-bit multiple-gradation image into a low-gradation image such as a binary image.

The input profile processor 82 or the output profile processor 84 is capable of correcting profiles depending on a print mode of the printing machine 18. The print mode refers to various print settings, such as the number of nozzles of the print head, timing (unidirectional/bidirectional) of ink ejection during scanning of the print head, the number of passes, the number and types of inks used in the printing machine 18, an algorithm for generating ink ejection control data, etc.

The main unit 24 includes a controller (not shown) comprising a CPU, etc., for controlling all of the image processing operations referred to above. More specifically, the controller controls not only operations of various components of the main unit 24, e.g., reading data from and writing data to the storage unit 80, but also acquisition of colorimetric data from the colorimeter 22 via the I/F 76.

The image processing apparatus 16 according to the present embodiment basically is constructed as described above. The image processing operations or functions described above can be performed according to application programs stored in the storage unit 80, which operate under the control of a basic program (operating system).

FIG. 5 is a functional block diagram of the profile generator 62 shown in FIG. 4.

The profile generator 62 basically comprises a data selector 86, a colorimetric value calculator 88, and a LUT generator 90.

The data selector 86 selects spectral data of a print medium under profile generating conditions (hereinafter referred to as "first spectral data 112"), spectral data of a laminating film (hereinafter referred to as "second spectral data 114"), and spectral data of an observational light source (hereinafter referred to as "third spectral data 116"), based on setting data 100, a group 102 of spectral data of mediums, a group 104 of spectral data of laminating films, and a group 106 of spectral data of observational light sources, which are read from the storage unit 80. The setting data 100 represent the type of medium 36, the laminating film 40, and the type of light source DS or the light source PS, which are set by the operator, and serve as setting data relative to profile generating conditions.

The colorimetric value calculator 88 calculates colorimetric value data 120 under profile generating conditions based on the first, second, and third spectral data 112, 114, 116 selected by the data selector 86.

The LUT generator 90 generates a color conversion LUT 124 under profile generating conditions based on the colorimetric value data 120 calculated by the colorimetric value calculator 88, and based on C, M, Y, K value data 122 corresponding to respective color patches 44 (see FIG. 3).

In the present embodiment, spectral data are supplied respectively in association with one hundred color patches 44, patch numbers of which range from 0 to 99, and the light wavelengths comprise forty-one items of data $\lambda_1$ through $\lambda_{41}$. For example, the light wavelengths are represented by $\lambda_1=400$ nm, ..., $\lambda_{41}=800$ nm, at respective intervals of 10 nm.

FIG. 6 is a functional block diagram of the colorimetric value calculator 88 shown in FIG. 5.

As shown in FIG. 6, the colorimetric value calculator 88 basically comprises a reflectance and transmittance predictor 88a, and a Lab calculator 88b.

The reflectance and transmittance predictor 88a predicts a spectral reflectance or a spectral transmittance of the protective-film-covered print 42 (hereinafter referred to as "fourth spectral data 118"), based on the first and second spectral data 112, 114 supplied from the data selector 86, by applying a mathematical model that depends on the type of medium 36.

In order to indicate the correspondence relationship between prints 38 and profiles, setting data for generating a profile corresponding to the first print 38a or the like (hereinafter referred to as a "first profile") will be referred to as first, second, third, and fourth spectral data 112, 114, 116, 118, respectively, whereas setting data for generating a profile corresponding to the second print 38b or the like (hereinafter referred to as a "second profile") will be referred to as first, second, third, and fourth spectral data 212, 214, 216, 218, respectively.

If the medium 36 is a reflective medium, then the first spectral data 112 represent the spectral reflectance of the medium 36, and the second spectral data 114 represent inherent reflectances, scattering coefficients, and absorption coefficients (optical property values) of the laminating film 40 with respect to the respective light wavelengths. If the medium 36 is a transmissive medium, then the first spectral data 112 represent the spectral transmittance of the medium 36, and the second spectral data 114 represent the spectral transmittance (optical property values) of the laminating film 40.

The Lab calculator 88b calculates colorimetric value data 120 under profile generating conditions based on the third spectral data 116 supplied from the data selector 86, the fourth spectral data 118 predicted by the reflectance and transmittance predictor 88a, and a color-matching function (spectral data in view of visual characteristics of a standard observer), not shown.

FIG. 7 is a view showing by way of example a setting image 130 for setting color conversion processing conditions.

As shown in FIG. 7, the setting image 130 includes three pull-down menus 132, 134, 136 arrayed successively downward in an upper left area thereof, three pull-down menus 138, 140, 142 arrayed successively downward in an upper right area thereof, a text box 144a and a button 144b displaying "OPEN" in a left central area thereof, a text box 146a and a button 146b displaying "OPEN" in a right central area thereof, a check box 148 located below the button 144b, and buttons 150, 152 displaying "CONVERT" and "CANCEL," respectively, in a lower right area thereof.

The pull-down menus 132, 134, 136 are arranged in a vertical array and have respective fields displaying "PVC (A)," "NONE," and "D50". The pull-down menus 138, 140, 142, which also are arranged in a vertical array, are disposed to the right of the pull-down menus 132, 134, 136, and have respective fields displaying "PVC(B)," "GLOSS," and "F8".

To the left of the pull-down menus 132, 134, 136, the terms "MEDIUM," "LAMINATE," and "LIGHT SOURCE" are displayed, respectively. Above the pull-down menus 132, 138, the terms "PRINTING SPOT" and "DISPLAY SPOT" are displayed, respectively.

The text box 144a and the button 144b are horizontally adjacent to each other. The text box 144a includes a field displaying "OrgImage.pdf" with the term "ORIGINAL IMAGE" displayed thereabove.

The text box 146a and the button 146b are horizontally adjacent to each other. The text box 146a includes a field displaying "NewImage.pdf" with the term "CONVERTED IMAGE" displayed thereabove.

A check mark can be added to or removed from the check box 148 when the mouse 32 (FIG. 1) is clicked. The words "BLACK POINT CORRECTION" are displayed to the right of the check box 148.

The printing system 10 according to the present embodiment is basically constructed as described above. Operations of the printing system 10 will be described below.

Figure 8:
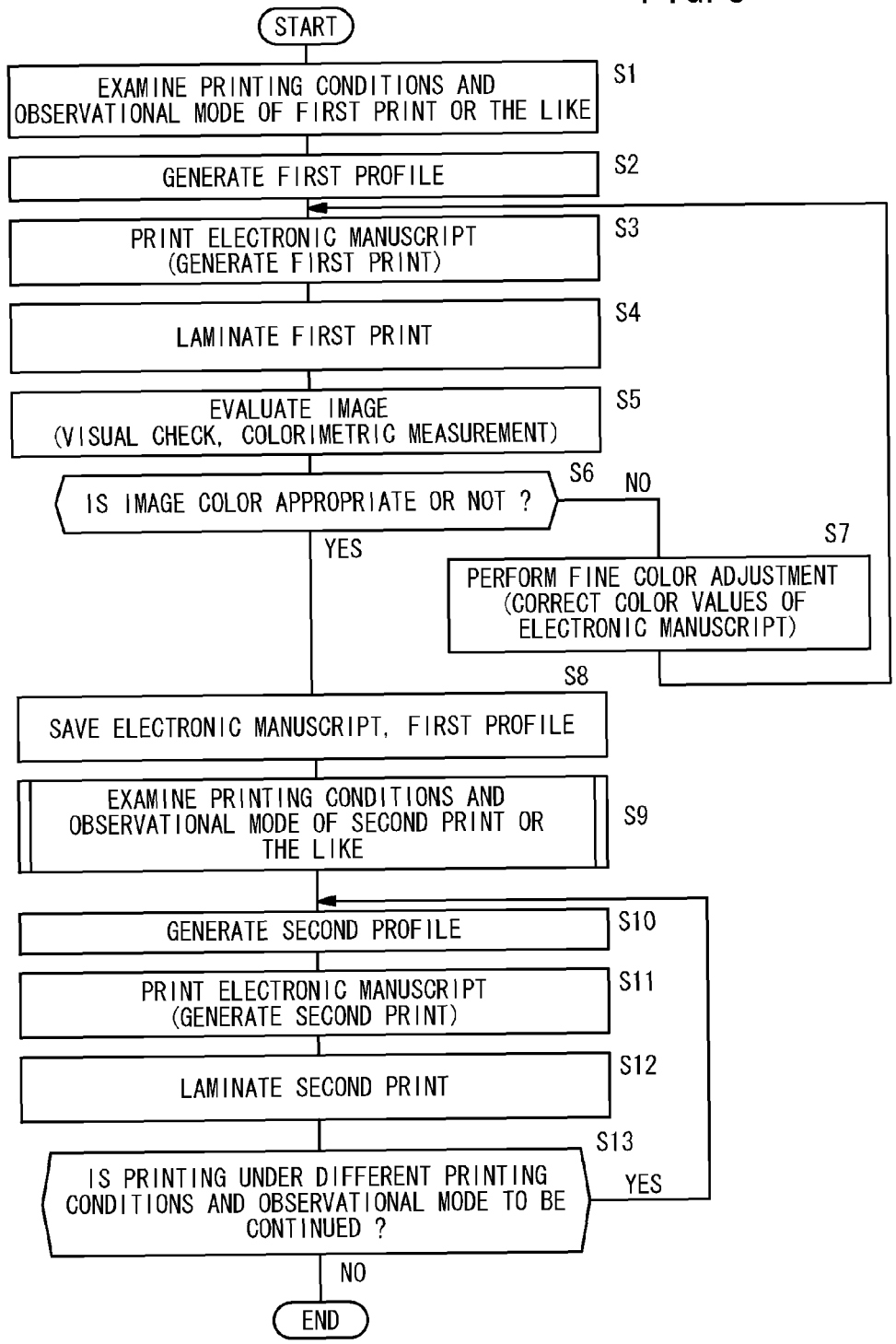
FIG. 8 is a flowchart of a sequence for producing a print or a protective-film-covered print, which has been appropriately adjusted in color using the printing system shown in FIG. 1.

FIG. 8 is a flowchart of a sequence for producing a print 38 or a protective-film-covered print 42, which has been appropriately adjusted in color using the printing system 10 according to the present embodiment. The sequence for producing a print 38 or a protective-film-covered print 42 will be described below mainly with reference to FIGS. 1 and 8.

The operator examines printing conditions and an observational mode of a first print 38a or the like to be produced (step S1). Such printing conditions refer to the type of printing machine 18 used to produce the first print 38a or the like, the type of first medium 36a, the type of first laminating film 40, the print mode referred to above, etc. The observational mode refers to attributes (type and spectral data) of the light source PS that serves as an observational light source, and the image type of the first print 38a that is observed. The image type may be a reflective image, i.e., an image observed with a reflective light source used as a main light source, a transmissive image, i.e., an image observed with a transmissive light source used as a main light source, or a mixed image, i.e., an image observed with a reflective light source and a transmissive light source used together as a main light source.

Various standard conditions for allowing an operator to increase efficiency of the color adjusting process are selected as printing conditions and an observational mode. More specifically, a readily available medium 36 and a standard "D50 light source" are used. Further, a printing condition in which a print 38 is not covered with a laminating film 40 may be selected.

Then, the operator generates a printing profile suitable for the printing machine 18, i.e., a first profile (step S2). If a profile suitable for the printing machine 18 is not registered, i.e., is not stored in the storage unit 80, then a first profile can be generated separately. The process for generating a first profile is the same as the process for generating a second profile carried out in step S9, to be described later.

Then, the operator prints an electronic manuscript using the printing machine 18, thereby producing a first print 38a (step S3). An image processing sequence performed by the image processing apparatus 16 for printing an electronic manuscript will be described in detail below with reference to FIG. 4.

When an electronic manuscript in PDL format, which is supplied from the editing apparatus 14, is input to the image processing apparatus 16 via the LAN 12 and the I/F 52, the electronic manuscript is converted into 8-bit C, M, Y, K raster data (device-dependent image data) by the RIP 54. The 8-bit C, M, Y, K raster data then are converted into L*, a*, b* data (device-independent image data) by the input profile processor 82. The L*, a*, b* data then are converted into C, M, Y, K value data (device-dependent image data) by the output profile processor 84. The C, M, Y, K value data then are converted into print control signals (ink ejection control data) by the printing machine driver 58. The print control signals are supplied from the printing machine driver 58 via the I/F 60 to the printing machine 18. Thereafter, the printing machine 18 produces a desired first print 38a based on the print control signals. Since target profiles and first profiles corresponding to a plurality of set conditions have been stored in the storage unit 80, a target profile and a first profile are selectively supplied to the input profile processor 82 and the output profile processor 84, depending on various preset conditions.

Then, the first print 38a produced by the printing machine 18 is laminated (step S4).

More specifically, the first laminating film 40a is applied to an image forming surface of the first print 38a (and, if necessary, a reverse surface thereof), and the first laminating film 40a is heated and pressed by a heating roller, not shown, of the laminating apparatus 20, for thereby producing the first protective-film-covered print 42a. The image on the first print 38a is thus made highly resistant to abrasion and is highly robust. If the first print 38a is not intended to be covered with the first laminating film 40a, then step S4 may be omitted.

Then, the operator evaluates colors of the color image constituting the first print 38a or the like (step S5), and determines whether the colors of the color image are appropriate or not (step S6). The operator may evaluate colors of the color image to determine whether desired hues are obtained, either by visually checking the color image based on observation of an overall or partial appearance of the color image, or by obtaining a colorimetric value of a certain area of the first print 38a or the like with the colorimeter 22, and determining whether or not the obtained colorimetric value falls within a desired range.

If the operator judges that colors of the color image of the first print 38a or the like are not suitable as a result of the image evaluation, then the operator corrects the color values of the electronic manuscript in order to make fine adjustments to the colors of the color image (step S7).

Thereafter, an electronic manuscript is printed and colors of the color image are evaluated repeatedly (steps S3 through S7) until a first print 38a or the like having desired colors is obtained.

Then, data of the electronic manuscript, color values of which have been corrected, and the first profile serving as the print profile, which have been used to produce the first print 38a, are saved (step S8). The electronic manuscript and the first profile may be saved in the storage unit 80 of the image processing apparatus 16, or may be saved in the editing apparatus 14 or the database DB, which are external to the image processing apparatus 16.

Figure 9:
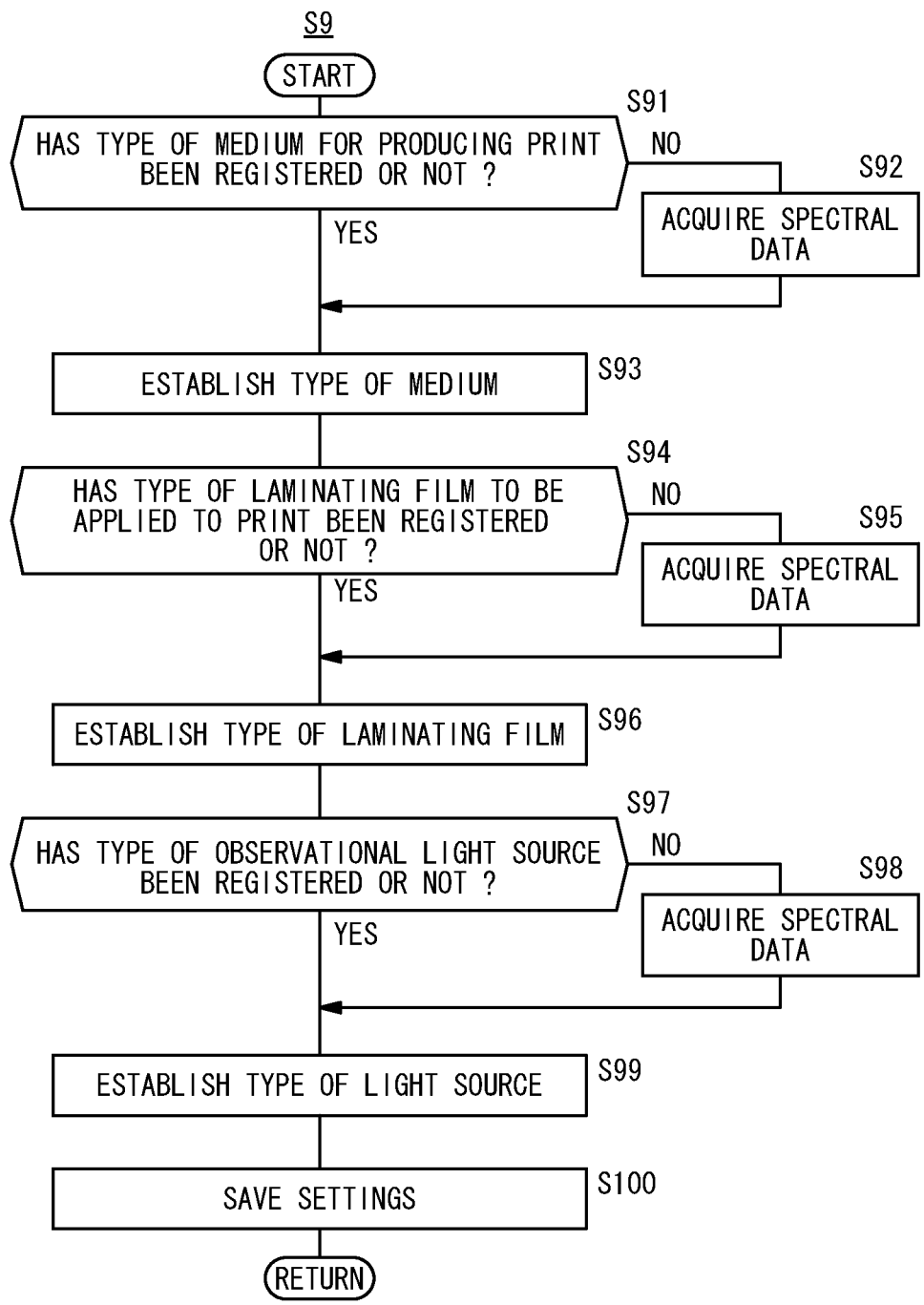
FIG. 9 is a flowchart of a process for setting printing conditions and an observational mode for a second print shown in FIG. 8.

Then, the operator sets printing conditions and an observational mode of a second print 38b or the like to be produced (step S9). A process for setting printing conditions and an observational mode of a second print 38b or the like to be produced will be described in detail below with reference to the flowchart shown in FIG. 9.

The operator confirms whether the type of medium 36 for producing the second print 38b, i.e., types of first and second mediums 36a, 36b, have already been registered (step S91).

If not registered, then spectral data of the first and second mediums 36a, 36b are acquired (step S92). For example, the operator prepares the portable memory 34, which stores spectral data of the first and second mediums 36a, 36b, and connects the portable memory 34 to the main unit 24 of the image processing apparatus 16. The spectral data stored in the portable memory 34 then are automatically or manually transferred into the storage unit 80 as new data. Alternatively, spectral data of the first and second mediums 36a, 36b may be managed by the database DB (see FIG. 1) and, if necessary, the database DB may be referred to for acquiring spectral data of the first and second mediums 36a, 36b. More specifically, the first acquirer 92 may acquire spectral data stored in the database DB via the LAN 12 and the I/F 52.

As another alternative, spectral data of the first and second mediums 36a, 36b may be acquired directly from the first and second mediums 36a, 36b using the colorimeter 22 connected to the main unit 24. A process of directly acquiring spectral data of the first and second mediums 36a, 36b using the colorimeter 22 will be described below mainly with reference to FIG. 4.

The operator enters a request to print the color chart 38c into a setting image, not shown, which is displayed on the display device 26. In response to the request, the image data generator 66 of the main unit 24 generates image data (C, M, Y, K values) for printing the color chart 38c, and supplies the generated image data to the printing machine driver 58. The printing machine driver 58 then converts the image data into print control signals, which are supplied to the printing machine 18 in the same manner as when the electronic manuscript is printed. In response to such print control signals, the printing machine 18 prints the color chart 38c (see FIG. 3).

C, M, Y, K value data 122 (see FIG. 5), which correspond to pixels of the respective color patches 44, are stored beforehand in the storage unit 80, and are read from the storage unit 80 when the image data generator 66 generates image data.

The operator measures spectral data of the color patches 44 of the color chart 38c (see FIG. 3) using the colorimeter 22, which is connected to the image processing apparatus 16. At this time, the laminating apparatus 20 does not perform a laminating process. It is preferable to determine in advance the sequence for colorimetrically measuring the color patches 44, e.g., (01) through (10) on column (A), (01) through (10) on column (B), using the numbers 46 and the alphabetical letters 48 shown in FIG. 3. Once the operator has completed the colorimetric measurement process, spectral data corresponding to the color patches 44 are saved in the storage unit 80 in relation to the type of print medium 36 via the I/F 76 (see FIG. 4).

After spectral data have been saved in the storage unit 80, a type of new print medium 36 can be selected from the selection fields (not shown) of the pull-down menus 132, 138 shown in FIG. 7. In FIG. 7, "PVC(A)" where "PVC" refers to polyvinyl chloride" is selected for the first medium 36a, and "PVC(B)" is selected for the second medium 36b.

The type of print medium 36 is thus established (step S93).

The operator then confirms whether the type of laminating film 40 to be applied to the print 38, i.e., types of the first and second laminating films 40a, 40b, have already been registered (step S94). If not registered, then spectral data of the first and second laminating films 40a, 40b are acquired (step S95). The portable memory 34 may store spectral data of the first and second laminating films 40a, 40b, and the operator may acquire spectral data of the first and second laminating films 40a, 40b from the portable memory 34. Alternatively, spectral data of the first and second laminating films 40a, 40b may be managed by the database DB (see FIG. 1) and, if necessary, the database DB may be referred to for acquiring spectral data of the first and second laminating films 40a, 40b. More specifically, the second acquirer 94 may acquire spectral data stored in the database DB via the LAN 12 and the I/F 52. As another alternative, the second acquirer 94 may acquire spectral data of the first and second laminating films 40a, 40b, which have been estimated by the optical property value estimator 68 (see FIG. 4).

After spectral data have been saved in the storage unit 80, a type of new laminating film 40 can be selected from the selection fields (not shown) of the pull-down menus 134, 140 shown in FIG. 7. In FIG. 7, the item "NONE," which implies that the first print 38a is not covered with the first laminating film 40a, is selected for the first laminating film 40a, and the item "GLOSS," which implies a highly glossy film, is selected for the second laminating film 40b.

The type of laminating film 40 is thus established (step S96).

The operator then confirms whether the type of observational light source DS or PS has already been registered (step S97). If not registered, then spectral data of the light source DS or PS are acquired (step S98). The portable memory 34 may store spectral data of the light sources DS, PS, and the operator may acquire spectral data of the light source DS or PS from the portable memory 34. Alternatively, spectral data of the light sources DS, PS may be managed by the database DB (see FIG. 1) and, if necessary, the database DB may be referred to for acquiring spectral data of the light sources DS, PS. More specifically, the third acquirer 96 may acquire spectral data stored in the database DB via the LAN 12 and the I/F 52. As another alternative, the contactless colorimeter 35 (see FIGS. 1 and 4) may be oriented toward a white reference plate or toward the light source DS or PS, and measure the white reference plate or the light source DS or PS in order to directly acquire spectral data of the light source DS or PS.

After spectral data have been saved in the storage unit 80, a type of new light source DS or PS can be selected from the selection fields (not shown) of the pull-down menus 136, 142 shown in FIG. 7. In FIG. 7, "DS50" (light source) is selected as the light source PS at the printing spot, and "F8" (light source) is selected as the light source DS at the display spot.

The type of observational light source DS or PS is thus established (step S99).

Finally, profile generating conditions, including the type of medium 36 established in step S93, the type of laminating film 40 established in step S96, and the type of light source DS or PS established in step S99, are saved (step S100).

The operator enters file names (including directory names) of the electronic manuscript saved in step S8 (see FIG. 8) as well as an electronic manuscript to be newly generated, respectively, into the text boxes 144a, 144b under "ORIGINAL IMAGE" and "CONVERTED IMAGE," respectively. More specifically, when the operator clicks on the buttons 144b, 146b that display "OPEN" with the mouse 32, a window image (not shown) is displayed, thereby allowing the operator to enter file names according to a GUI sequence. After having entered required settings into the setting image 130, the operator clicks on the button 150 that displays "CONVERT," thereby automatically storing the settings as setting data 100 (see FIG. 5) in the storage unit 80.

The setting data 100 include data representative of the type of first medium 36a (second medium 36b) set by the pull-down menu 132 (138), the type of first laminating film 40a (second laminating film 40b) set by the pull-down menu 134 (140), and the type of light source DS (light source PS) set by the pull-down menu 136 (142).

Then, referring back to FIG. 8, a second profile is generated (step S10). More specifically, after the setting data 100 have been stored in the storage unit 80, the setting data 100 are supplied to the profile generator 62, which automatically generates the second profile.

An algorithm for generating the second profile will be described in detail below with reference to FIGS. 5 and 6. As described above, the profile generator 62 is capable of generating not only a second profile, but also a first profile. For illustrative purposes, when describing the algorithm for generating the second profile, the same reference characters used with respect to the first profile will be used to denote various components thereof.

As shown in FIG. 5, the data selector 86 selects the first, second, and third spectral data 112, 114, 116 associated with the setting data 100 from among the setting data 100, the group 102 of spectral data of mediums, the group 104 of spectral data of laminating films, and the group 106 spectral data of observational light sources, which are supplied from the storage unit 80.

As shown in FIG. 6, by applying a given mathematical model, the reflectance and transmittance predictor 88a of the colorimetric value calculator 88 predicts fourth spectral data 118, which is representative of the spectral reflectance of the protective-film-covered print 42, based on the first and second spectral data 112, 114.

If the medium 36 is a reflective medium, then a Kubelka-Munk model can be applied. More specifically, the spectral reflectance $R(\lambda)$ of the protective-film-covered print 42 is predicted according to the following equation (1).

$$R(\lambda)=[(R_g-R_\infty)/R_\infty-R_\infty(R_g-1/R_\infty)\exp\{Sx(1/R_\infty-R_\infty)\}]/[(R_g-R_\infty)-(R_g-1/R_\infty)\exp\{Sx(1/R_\infty-R_\infty)\}] \quad (1)$$

where [$R_g$] indicates the spectral reflectance of the print 38 alone (first spectral data 112), [$R_\infty$] indicates the inherent spectral reflectance of the laminating film 40, [S] indicates the scattering coefficient per unit thickness of the laminating film 40, and [x] indicates the thickness of the laminating film 40 (see "New Contributions to the Optics of Intensely Light-Scattering Materials", Part I, Journal of the Optical Society of America, Volume 38, Number 5, PP. 448-457, MAY 1948).

The optical property values of the laminating film 40 may be stored as pre-measured numerical values in the storage unit 80, or may be estimated in the image processing apparatus 16 based on measured results obtained by the colorimeter 22. A process for estimating optical property values of the laminating film 40, or more specifically, a process of experimentally estimating unknown variables $R_\infty$ (inherent reflectance) and Sx (scattering coefficient), will be described in detail below.

Figure 10:
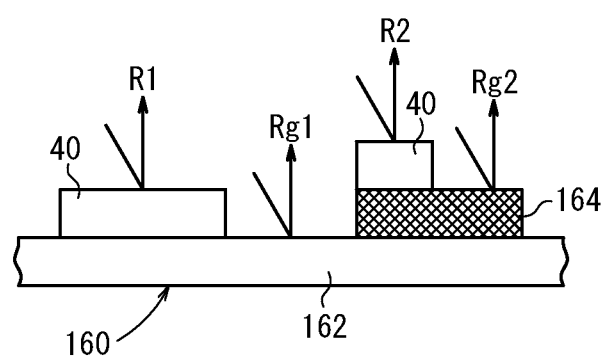
FIG. 10 is a view showing a measurement specimen fabricated to estimate optical property values of a laminating film.

FIG. 10 is a view showing a measurement specimen 160 fabricated to estimate optical property values of the laminating film 40.

As shown in FIG. 10, the measurement specimen 160 comprises a base 162 made of a white opaque material, having a spectral reflectance $Rg_1$, a black layer 164, and a laminating film 40, which are to be measured.

The operator measures spectral reflectances of various regions of the measurement specimen 160 with the colorimeter 22. It is assumed that, as a result of such measurements, the laminating film 40 disposed on the base 162 provides a spectral reflectance $R_1$, the black layer 164 disposed on the base 162 provides a spectral reflectance $Rg_2$, and the laminating film 40 disposed on the base 162 with the black layer 164 interposed therebetween provides a spectral reflectance $R_2$ ($R_1 > R_2$).

The measured values are saved in the storage unit 80 of the main unit 24 of the image processing apparatus 16 via the I/F 76. Thereafter, the measured values are read from the storage unit 80 and supplied to the optical property value estimator 68, which calculates values according to the equations shown below.

Based on mathematical analysis, an inherent reflectance $R_\infty$ of the laminating film 40 is calculated according to the following equation (2).

$$R_\infty=\{C+\sqrt{(C^2-4)}\}/2 \quad (2)$$

where C is determined by the following equation (3).

$$C=\{(R_1+Rg_2)(R_2 \cdot Rg_1-1)-(R_2+Rg_1)(R_1 \cdot Rg_2-1)\}/(R_2 \cdot Rg_1-R_1 \cdot Rg_2) \quad (3)$$

(see Special Topic: "It's only paper, yet it's paper, and after all, it's paper",—Paper properties and their evaluation methods with latest relevant testing standards (Journal of Japan Image Society 150, 2004). If $R_1 < R_2$, then the suffixes "1" and "2" in equation (3) are switched.

The inherent reflectance $R_\infty$ represents a spectral reflectance assuming that the specimen has an infinite thickness. If it is possible to superpose a number of laminating films 40 of one type, then the inherent reflectance $R_\infty$ may be measured directly.

Using a measured value $R_n$ (n=1 or 2), a measured value $Rg_n$ (n=1 or 2), and $R_\infty$ as calculated according to equation (2), the scattering coefficient S and the thickness x of the laminating film 40 are calculated according to the following equation (4).

$$S \cdot x = 1n[\{(R_\infty-Rg_n)(1/R_\infty-R_n)\}/\{(R_\infty-R_n)(1/R_\infty-Rg_n)\}]/(1/R_\infty-R_\infty) \quad (4)$$

(see "Basics and Applied Technologies of Color Representation", page 88, equation (21) (Triceps)).

In equation (4), S represents a scattering coefficient per unit thickness, and x represents the thickness of the laminating film 40. For illustrative purposes, at a given film thickness x, Sx (=S·x) is defined as a scattering coefficient, i.e., one variable. However, either S or Sx may be used as a scattering coefficient. This holds true for the absorption coefficient K as well.

Therefore, it is possible to estimate optical property values of the laminating film 40, i.e., the inherent reflectance $R_\infty$ and the scattering coefficient Sx, using the measurement specimen 160, which is made up of a combination of the base 162, the black layer 164, and the laminating film 40.

If the medium 36 is a transmissive medium, then the spectral transmittance of the protective-film-covered print 42 can accurately be estimated by multiplying the spectral transmittances of the medium 36 and the laminating film 40.

In FIG. 6, the Lab calculator 88b calculates colorimetric value data 120 under profile generating conditions based on the third spectral data 116 and the fourth spectral data 118. Such colorimetric value data 120 under profile generating conditions represent L*, a*, b* values, which are estimated based on measured values for observing the protective-film-covered print 42 under the light source DS.

More specifically, tristimulus values X, Y, Z of the color patches 44 correspond to values produced by multiplying the spectral reflectance (or spectral transmission) of the protective-film-covered print 42 and the color matching function, and then integrating the product obtained thereby within a range of visible wavelengths. L*, a*, b* values of the color patches 44 are calculated as colorimetric value data 120 based on the tristimulus values X, Y, Z according to a given function. According to the present embodiment, since one hundred color patches 44 are measured, one hundred sets of L*, a*, b* values are obtained.

The LUT generator 90 shown in FIG. 5 can then generate a color conversion LUT 124 for converting three-dimensional data (L*, a*, b* values) as a print profile into four-dimensional data (C, M, Y, K values), based on a correspondence relationship between the one hundred sets of colorimetric value data 120 and the one hundred sets of L*, a*, b* values.

In other words, spectral reflectances (or spectral transmissions) corresponding to the respective grid points of a color conversion table are determined based on the spectral reflectance (or spectral transmission) of the protective-film-covered print 42. In addition, the profile of the protective-film-covered print 42 is determined based on the determined spectral reflectances (or spectral transmissions).

With the above arrangement, once spectral data of the medium 36, the laminating film 40, and the light source DS have been acquired, a print profile can be estimated without the need for producing the protective-film-covered print 42 itself. Accordingly, the number of processes required to generate a profile, including printing of the color chart 38c by the printing machine 18 (including waiting time), the laminating process performed by the laminating apparatus 20, and colorimetric measurements carried out by, the colorimeter 22, can be reduced.

In this manner, the second profile is generated (step S10).

Then, an electronic print is printed (step S11). The image processing sequence performed by the image processing apparatus has been described above and will not be described again below (refer to step S3). However, printing of an electronic print in step S11 differs from printing of the electronic print in step S3 in that an electronic manuscript suitable for printing of the first print 38a or the like, which was saved in step S8, is used, whereby color conversion is performed using the first profile as an input profile supplied to the color converter 56 (see FIG. 4) and using the second profile as an output profile supplied from the color converter 56.

Since the first profile suitable for the first print 38a or the like is used as an input profile and the second profile suitable for the second print 38b or the like is used as an output profile, color reproduction of the second print 38b or the like depending on various printing conditions and observational modes can appropriately be carried out directly using the electronic manuscript suitable for printing the first print 38a or the like.

If at least one of the first print 38a and the second print 38b is covered with the laminating film 40, then the color conversion LUT 124 of the first or second profile can be processed for black point correction by the black point correction processor 64.

Black point correction refers to a color conversion process for mapping color values of black points on the border of a gamut with respect to the first profile (hereinafter referred to as a "first gamut") onto color values of black points on the border of a gamut with respect to the second profile (hereinafter referred to as a "second gamut").

As shown in FIG. 7, it is possible to determine whether black point correction is turned on or off based on the check box 148 displayed in the setting image 130. If a check mark is added to the check box 148, then black point correction is turned on. If a check mark is not added to the check box 148, then black point correction is turned off.

An algorithm for performing black point correction may be the process disclosed in Japanese Laid-Open Patent Publication No. 2004-153554. The disclosed process will briefly be described below with reference to FIGS. 11A through 11C.

FIG. 11A is a graph showing the positional relationship between a first gamut 170 (enclosed by solid lines) and a second gamut 172 (enclosed by broken lines) prior to black point correction. The graph has a horizontal axis representing a* and a vertical axis representing L*, and shows a cross section of a three-dimensional space L*a*b*. FIGS. 11B and 11C also have horizontal and vertical axes defined in the same fashion.

It is assumed that the first gamut 170 is a gamut produced when the first medium 36a, which is not covered with the laminating film 40, is observed under the light source PS, whereas the second gamut 172 is a gamut produced when the first medium 36a, covered with the laminating film 40, is observed under the light source PS. In other words, the first gamut 170 and the second gamut 172 are different from each other, depending on whether or not the first medium 36a is covered with the laminating film 40.

It also is assumed that the first gamut 170 includes a white point wt1 represented by $(L^*_{wt1}, a^*_{wt1}, b^*_{wt1})$ and a black point bk1 represented by $(L^*_{bk1}, a^*_{bk1}, b^*_{bk1})$, and that the second gamut 172 includes a white point wt2 represented by $(L^*_{wt2}, a^*_{wt2}, b^*_{wt2})$ and a black point bk2 represented by $(L^*_{bk2}, a^*_{bk2}, b^*_{bk2})$.

First, the first gamut 170 and the second gamut 172 are translated downward in order to bring the black point bk1 of the first gamut 170 and the black point bk2 of the second gamut 172 into alignment with each other. If color values of the first gamut 170 and the second gamut 172 after black point correction are represented respectively by $(L_1', a_1', b_1')$ and $(L_2', a_2', b_2')$, then conversion formulas of the respective first and second gamuts 170, 172 are expressed by the following equations (5) and (6).

$$(L_1', a_1', b_1') = (L^* - L^*_{bk1}, a^* - a^*_{bk1}, b^* - b^*_{bk1}) \quad (5)$$

$$(L_2', a_2', b_2') = (L^* - L^*_{bk2}, a^* - a^*_{bk2}, b^* - b^*_{bk2}) \quad (6)$$

After the first gamut 170 and the second gamut 172 have been translated, the first gamut 170 and the second gamut 172 are converted into a first gamut 170s and a second gamut 172s, respectively, as shown in FIG. 11B. As shown in FIG. 11B, color values of a black point bk1' converted from the black point bk1 and color values of a black point bk2' converted from the black point bk2 are equal to each other as (0, 0, 0).

While keeping the black points bk1' and bk2' in agreement with each other, the first gamut 170s and the second gamut 172s are converted in order to bring a white point wt1' of the first gamut 170s and a white point wt2' of the second gamut 172s into alignment with each other. Since the area of the first gamut 170s is greater than the area of the second gamut 172s, the second gamut 172s is enlarged upwardly into a second gamut 172k.

According to the present embodiment, a Von-Kries transformation process, which is one type of chromatic adaptation model, is applied to bring the white points into alignment with each other while fixing the black points. However, the conversion algorithm is not limited to a Von-Kries transformation process, but may be a gamut similarity transformation process (for changing ratios), a Bradford transformation process, a CIECAM97s transformation process, a CIECAM02s transformation process, or the like.

A Von-Kries transformation formula for converting the second gamut 172s into the second gamut 172k is expressed by the following equation (7).

$$\begin{bmatrix} X'' \\ Y'' \\ Z'' \end{bmatrix} = [M^{-1}] \begin{bmatrix} P_{new}/P_{org} & 0 & 0 \\ 0 & Q_{new}/Q_{org} & 0 \\ 0 & 0 & R_{new}/R_{org} \end{bmatrix} [M] \begin{bmatrix} X' \\ Y' \\ Z' \end{bmatrix} \quad (7)$$

where (X', Y', Z') represent color values prior to the gamut conversion, (X", Y", Z") represent color values subsequent to the gamut conversion, [M$^{-1}$] is an inverted conversion matrix of [M], and [M] is a 3×3 matrix for converting X, Y, Z values into P, Q, R values, which are related to the response of cones of the human eyes. Other variables are expressed by the following equation (8).

$$\begin{bmatrix} P_{org} \\ Q_{org} \\ R_{org} \end{bmatrix} = [M] \begin{bmatrix} X'_{wt2} \\ Y'_{wt2} \\ Z'_{wt2} \end{bmatrix}, \begin{bmatrix} P_{new} \\ Q_{new} \\ R_{new} \end{bmatrix} = [M] \begin{bmatrix} X'_{wt1} \\ Y'_{wt1} \\ Z'_{wt1} \end{bmatrix} \quad (8)$$

Color values of white points wt1', wt2' are represented respectively by (X$_{wt1}$', Y$_{wt1}$', Z$_{wt1}$'), (X$_{wt2}$', Y$_{wt2}$', Z$_{wt2}$').

Rather than converting the gamuts in two stages, as described above, the second gamut 172 may be converted directly into the second gamut 172k according to a conversion formula expressed by the following equations (9) and (10).

$$\begin{bmatrix} X'' \\ Y'' \\ Z'' \end{bmatrix} = [M^{-1}] \begin{bmatrix} (P''_{wt} - P''_{bk})(P - P_{bk})/(P_{wt} - P_{bk}) + P''_{bk} \\ (Q''_{wt} - Q''_{bk})(Q - Q_{bk})/(Q_{wt} - Q_{bk}) + Q''_{bk} \\ (R''_{wt} - R''_{bk})(R - R_{bk})/(R_{wt} - R_{bk}) + R''_{bk} \end{bmatrix} \quad (9)$$

$$\begin{bmatrix} P \\ Q \\ R \end{bmatrix} = [M] \begin{bmatrix} X \\ Y \\ Z \end{bmatrix},$$

$$\begin{bmatrix} P'_{wt} \\ Q'_{wt} \\ R'_{wt} \end{bmatrix} = [M] \begin{bmatrix} X_{wt} \\ Y_{wt} \\ Z_{wt} \end{bmatrix}, \begin{bmatrix} P_{bk} \\ Q_{bk} \\ R_{bk} \end{bmatrix} = [M] \begin{bmatrix} X_{bk} \\ Y_{bk} \\ Z_{bk} \end{bmatrix},$$

$$\begin{bmatrix} P''_{wt} \\ Q''_{wt} \\ R''_{wt} \end{bmatrix} = [M] \begin{bmatrix} X''_{wt} \\ Y''_{wt} \\ Z''_{wt} \end{bmatrix}, \begin{bmatrix} P''_{bk} \\ Q''_{bk} \\ R''_{bk} \end{bmatrix} = [M] \begin{bmatrix} X''_{bk} \\ Y''_{bk} \\ Z''_{bk} \end{bmatrix} \quad (10)$$

Color values of a white point wt2 and a black point bk2 of the second gamut 172 are represented respectively by (X$_{wt}$, Y$_{wt}$, Z$_{wt}$), (X$_{bk}$, Y$_{bk}$, Z$_{bk}$), and color values of a white point wt2" and a black point bk2" of the second gamut 172k are represented respectively by (X$_{wt}$", Y$_{wt}$", Z$_{wt}$"), (X$_{bk}$", Y$_{bk}$", Z$_{bk}$").

The relationship between L*, a*, b* values and X, Y, Z values is expressed by the following equations (11) through (13).

$$L^* = 116\left(\frac{Y}{Y_{ST}}\right)^{\frac{1}{3}} - 16 \quad (11)$$

$$a^* = 500\left\{\left(\frac{X}{X_{ST}}\right)^{\frac{1}{3}} - \left(\frac{Y}{Y_{ST}}\right)^{\frac{1}{3}}\right\} \quad (12)$$

$$b^* = 200\left\{\left(\frac{Y}{Y_{ST}}\right)^{\frac{1}{3}} - \left(\frac{Z}{Z_{ST}}\right)^{\frac{1}{3}}\right\} \quad (13)$$

where (X$_{ST}$, Y$_{ST}$, Z$_{ST}$) represent standard color values. The inverse conversion represented by equations (11) through (13) makes it possible to convert color values (L*, a*, b*) uniquely into color values (X, Y, Z).

In this manner, the second gamut 172k is obtained by a Von-Kries transformation process. As shown in FIG. 11C, color values of the white point wt1' and color values of the white point wt2" converted from the white point wt2' are in agreement with each other.

As described above, when the gamuts are mapped, i.e., translated according to the present embodiment, in order to bring color values of black points with respect to the first profile into agreement with color values of black points with respect to the second profile, color reproducibility, particularly in a shadow area, is essentially equalized between the first print 38a or the like and the second print 38b or the like.

In the nature of the above algorithm, black point correction is virtually ineffective if the print is not covered with either the first laminating film 40a or the second laminating film 40b. Therefore, when an operator selects "NONE" in the pull-down menus 134, 140 shown in FIG. 12A, the GUI image display controller 70 (see FIG. 4) may immediately change the check box 148 and the letters "BLACK POINT CORRECTION" to a non-display area 180.

Alternatively, when the operator selects "NONE" in the pull-down menus 134, 140 shown in FIG. 12B, the GUI image display controller 70 (see FIG. 4) may replace the check box 148, which is actively displayed, with a passively displayed check box 182. The setting images shown in FIGS. 12A and 12B thus are effective to prevent ON and OFF settings of the black point correction from being changed under certain conditions.

Referring back to FIG. 8, after the printing machine 18 has printed the electronic manuscript, the produced second print 38b is laminated (step S12).

The separate color adjusting process of step S7 shown in FIG. 8 is not required for the second print 38b or the like, because colors adjusted on the first protective-film-covered print 42a are applied directly to the second protective-film-covered print 42b.

Then, it is determined whether or not a printing process under different printing conditions and observational modes is to be continued (step S13). Steps S10 through S12 are repeated until all of such printing processes are completed.

As described above, according to the present invention, the first spectral data 112, 212 of the first print 38a and the second print 38b, the second spectral data 214 of the first laminating film 40a and the second laminating film 40b, and the third spectral data 116, 216 of the light source PS and the light source DS are acquired. A first profile corresponding to the first print 38a or the like is generated based on the acquired first and second spectral data 112, 114 and the acquired third spectral data 116 of the light source PS, and a second profile corresponding to the second print 38b or the like is generated based on the acquired first and second spectral data 212, 214 and the acquired third spectral data 116 of the light source DS. Using the generated first profile as an input profile and the generated second profile as an output profile, image data representing an image of the first print 38a are converted in color into image data representing an image of the second print 38b. Therefore, color reproduction of the second print 38b or the like depending on various printing conditions and observational modes can appropriately be carried out directly using color image data suitable for printing the first print 38a or the like. Consequently, fine color adjustments do not need to be performed each time that combinations of printing conditions and observational modes are changed, and the number of man-hours required for such fine color adjustments can be greatly reduced.

In the illustrated embodiment, the color chart 38c has one hundred color patches 44, forty-one items of spectral data, and light wavelengths spaced at intervals of 10 nm. However, these values can freely be changed in view of the accuracy of color reproduction, the time required to perform the image processing sequence, etc., which are taken into account as a whole.

In the illustrated embodiment, a Kubelka-Munk model is used as a formula for predicting colorimetric values of the protective-film-covered print 42. However, modifications of the Kubelka-Munk model, or other mathematical models, may be used to predict colorimetric values of the protective-film-covered print 42.

In the illustrated embodiment, the printing machine 18 comprises an inkjet printing apparatus. However, the printing machine 18 may comprise an electrophotographic printer, a thermal printer, or any of various other types of printers.

Although a certain preferred embodiment of the present invention has been shown and described in detail, it should be understood that various changes and modifications may be made to the embodiment without departing from the scope of the invention as set forth in the appended claims.

What is claimed is:

1. A color converting method comprising:
    a first acquiring step of acquiring an optical property value of a first print printed on a first medium and an optical property value of a second print printed on a second medium, which is either the same as or different from the first medium;
    a second acquiring step of acquiring an optical property value of a second protective film that covers the second print;
    a third acquiring step of acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film;
    a first generating step of generating a first profile corresponding to the first print based on the acquired optical property value of the first print and the acquired spectral distribution of the first light source;
    a second generating step of generating a second profile corresponding to the second protective-film-covered print based on the acquired optical property value of the second print, the acquired optical property value of the second protective film, and the acquired spectral distribution of the second light source; and
    a color converting step for converting colors of image data representing an image of the first print into colors of image data representing an image of the second print, using the generated first profile as an input profile and the generated second profile as an output profile.

2. A color converting method according to claim 1, wherein the first acquiring step further comprises the steps of:
    designating types of mediums; and
    acquiring the optical property values corresponding to the designated types of mediums by referring to a database or by colorimetrically measuring the prints.

3. A color converting method according to claim 1, wherein the second acquiring step further comprises the steps of:
    designating a type of protective film; and
    acquiring the optical property value corresponding to the designated type of protective film by referring to a database or by measuring the protective film.

4. A color converting method according to claim 1, wherein the third acquiring step further comprises the steps of:
    designating types of light sources; and
    acquiring the spectral distributions corresponding to the designated types of light sources by referring to a database or by measuring the light sources.

5. A color converting method according to claim 1, wherein the color converting step further comprises the step of:
    mapping a color value of a black point with respect to the first profile onto a color value of a black point with respect to the second profile.

6. A color converting method according to claim 1, wherein the mediums comprise reflective mediums, the optical property values of the prints comprise spectral reflectances, and the optical property values of the protective films comprise two independent optical property values among an inherent reflectance, a scattering coefficient, and an absorption coefficient at each light wavelength of the protective films.

7. A color converting method according to claim 1, wherein the mediums comprise transmissive mediums, and the optical property values of the prints and the optical property values of the protective films comprise spectral transmittances.

8. A color converting method comprising:
    a first acquiring step of acquiring an optical property value of a first print printed on a first medium and an optical property value of a second print printed on a second medium, which is either the same as or different from the first medium;
    a second acquiring step of acquiring an optical property value of a first protective film that covers the first print and an optical property value of a second protective film that covers the second print, the second protective film being either the same as or different from the first protective film;
    a third acquiring step of acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film;

a first generating step of generating a first profile corresponding to the first protective-film-covered print based on the acquired optical property value of the first print, the acquired optical property value of the first protective film, and the acquired spectral distribution of the first light source;

a second generating step of generating a second profile corresponding to the second protective-film-covered print based on the acquired optical property value of the second print, the acquired optical property value of the second protective film, and the acquired spectral distribution of the second light source; and a color converting step of converting colors of image data representing an image of the first print into colors of image data representing an image of the second print, using the generated first profile as an input profile and the generated second profile as an output profile.

9. A color converting method according to claim 8, wherein the first acquiring step further comprises the steps of:
designating types of mediums; and
acquiring the optical property values corresponding to the designated types of mediums by referring to a database or by colorimetrically measuring the prints.

10. A color converting method according to claim 8, wherein the second acquiring step further comprises the steps of:
designating types of protective films; and
acquiring the optical property values corresponding to the designated types of protective films by referring to a database or by measuring the protective films.

11. A color converting method according to claim 8, wherein the third acquiring step further comprises the steps of:
designating types of light sources; and
acquiring the spectral distributions corresponding to the designated types of light sources by referring to a database or by measuring the light sources.

12. A color converting method according to claim 8, wherein the color converting step further comprises the step of:
mapping a color value of a black point with respect to the first profile onto a color value of a black point with respect to the second profile.

13. A color converting method according to claim 12, further comprising the steps of:
displaying an image according to a GUI;
designating a type of the first protective film or the second protective film based on a user operation according to the GUI; and
changing the image according to the GUI, so as to disable a selection as to whether to carry out the mapping step if the type of the first protective film or the second protective film is designated as not covering a print, and to enable a selection as to whether to carry out the mapping step if the type of the first protective film or the second protective film is designated otherwise.

14. A color converting method according to claim 8, wherein the mediums comprise reflective mediums, the optical property values of the prints comprise spectral reflectances, and the optical property values of the protective films comprise two independent optical property values among an inherent reflectance, a scattering coefficient, and an absorption coefficient at each light wavelength of the protective films.

15. A color converting method according to claim 8, wherein the mediums comprise transmissive mediums, and the optical property values of the prints and the optical property values of the protective films comprise spectral transmittances.

16. A color converting apparatus comprising:
a first acquirer for acquiring an optical property value of a first print printed on a first medium and an optical property value of a second print printed on a second medium, which is either the same as or different from the first medium;
a second acquirer for acquiring an optical property value of a second protective film that covers the second print;
a third acquirer for acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film;
a profile generator for generating a first profile corresponding to the first print based on the optical property value of the first print acquired by the first acquirer and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer; and
a color converter for converting colors of image data representing an image of the first print into colors of image data representing an image of the second print, using the first profile generated by the profile generator as an input profile and the second profile generated by the profile generator as an output profile.

17. A color converting apparatus comprising:
a first acquirer for acquiring an optical property value of a first print printed on a first medium and an optical property value of a second print printed on a second medium, which is either the same as or different from the first medium;
a second acquirer for acquiring an optical property value of a first protective film that covers the first print and an optical property value of a second protective film that covers the second print, the second protective film being either the same as or different from the first protective film;
a third acquirer for acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film;
a profile generator for generating a first profile corresponding to the first protective-film-covered print based on the optical property value of the first print acquired by the first acquirer, the optical property value of the first protective film acquired by the second acquirer, and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer; and a color converter for converting colors of image data representing an image of the first print into colors of image data representing an image of the second print, using the first profile generated by the profile generator as an input profile and the second profile generated by the profile generator as an output profile.

18. A non-transitory recording medium storing therein a program to be executed by a computer, the program enabling the computer to function as:

a first acquirer for acquiring an optical property value of a first print printed on a first medium and an optical property value of a second print printed on a second medium, which is either the same as or different from the first medium;

a second acquirer for acquiring an optical property value of a second protective film that covers the second print;

a third acquirer for acquiring a spectral distribution of a first light source, which serves as an observational light source for the first print, and a spectral distribution of a second light source, which is either the same as or different from the first light source and which serves as an observational light source for a second protective-film-covered print produced by covering the second print with the second protective film;

a profile generator for generating a first profile corresponding to the first print based on the optical property value of the first print acquired by the first acquirer and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer; and a color converter for converting colors of image data representing an image of the first print into colors of image data representing an image of the second print, using the first profile generated by the profile generator as an input profile and the second profile generated by the profile generator as an output profile.

19. A non-transitory recording medium storing therein a program to be executed by a computer, the program enabling the computer to function as:

a first acquirer for acquiring an optical property value of a first print printed on a first medium and an optical property value of a second print printed on a second medium, which is either the same as or different from the first medium;

a second acquirer for acquiring an optical property value of a first protective film that covers the first print and an optical property value of a second protective film that covers the second print, the second protective film being either the same as or different from the first protective film;

a third acquirer for acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for a second protective-film-covered print produced by covering the second print with the second protective film;

a profile generator for generating a first profile corresponding to the first protective-film-covered print based on the optical property value of the first print acquired by the first acquirer, the optical property value of the first protective film acquired by the second acquirer, and the spectral distribution of the first light source acquired by the third acquirer, and generating a second profile corresponding to the second protective-film-covered print based on the optical property value of the second print acquired by the first acquirer, the optical property value of the second protective film acquired by the second acquirer, and the spectral distribution of the second light source acquired by the third acquirer; and a color converter for converting colors of image data representing an image of the first print into colors of image data representing an image of the second print, using the first profile generated by the profile generator as an input profile and the second profile generated by the profile generator as an output profile.

20. A color converting method comprising:

a first acquiring step of acquiring an optical property value of a first print printed on a first medium and an optical property value of a second print printed on a second medium, which is either the same as or different from the first medium;

a second acquiring step of acquiring an optical property value of a first protective film that covers the first print;

a third acquiring step of acquiring a spectral distribution of a first light source, which serves as an observational light source for a first protective-film-covered print produced by covering the first print with the first protective film, and a spectral distribution of a second light source, which is either the same as or different from the first light source and which serves as an observational light source for the second print;

a first generating step of generating a first profile corresponding to the first protective-film-covered print based on the acquired optical property value of the first print, the acquired optical property value of the first protective film, and the acquired spectral distribution of the first light source;

a second generating step of generating a second profile corresponding to the second print based on the acquired optical property value of the second print and the acquired spectral distribution of the second light source; and a color converting step of converting colors of image data representing an image of the first print into colors of image data representing an image of the second print, using the generated first profile as an input profile and the generated second profile as an output profile.

21. A color converting method according to claim 20, wherein the first acquiring step further comprises the steps of:
 designating types of mediums; and
 acquiring the optical property values corresponding to the designated types of mediums by referring to a database or by colorimetrically measuring the prints.

22. A color converting method according to claim 20, wherein the second acquiring step further comprises the steps of:
 designating a type of protective film; and
 acquiring the optical property value corresponding to the designated type of protective film by referring to a database or by measuring the protective film.

23. A color converting method according to claim 20, wherein the third acquiring step further comprises the steps of:
designating types of light sources; and
acquiring the spectral distributions corresponding to the designated types of light sources by referring to a database or by measuring the light sources.

24. A color converting method according to claim 20, wherein the color converting step further comprises the step of:
mapping a color value of a black point with respect to the first profile onto a color value of a black point with respect to the second profile.

25. A color converting method according to claim 20, wherein the mediums comprise reflective mediums, the optical property values of the prints comprise spectral reflectances, and the optical property values of the protective films comprise two independent optical property values among an inherent reflectance, a scattering coefficient, and an absorption coefficient at each light wavelength of the protective films.

26. A color converting method according to claim 20, wherein the mediums comprise transmissive mediums, and the optical property values of the prints and the optical property values of the protective films comprise spectral transmittances.

27. A color converting apparatus comprising:
a first acquiring unit configured to acquire an optical property value of a first print printed on a first medium and an optical property value of a second print printed on a second medium, which is either the same as or different from the first medium;
a second acquiring unit configured to acquire an optical property value of a first protective film that covers the first print;
a third acquiring unit configured to acquire a spectral distribution of a first light source, which serves as an observational light source for a first protective-film-covered print produced by covering the first print with the first protective film, and a spectral distribution of a second light source, which is either the same as or different from the first light source and which serves as an observational light source for the second print;
a first generating unit configured to generate a first profile corresponding to the first protective-film-covered print based on the acquired optical property value of the first print, the acquired optical property value of the first protective film, and the acquired spectral distribution of the first light source;
a second generating unit configured to generate a second profile corresponding to the second print based on the acquired optical property value of the second print and the acquired spectral distribution of the second light source; and
a color converting unit configured to convert colors of image data representing an image of the first print into colors of image data representing an image of the second print, using the generated first profile as an input profile and the generated second profile as an output profile.

28. A non-transitory recording medium storing therein a program to be executed by a computer, the program enabling the computer to function as:
a first acquiring unit configured to acquire an optical property value of a first print printed on a first medium and an optical property value of a second print printed on a second medium, which is either the same as or different from the first medium;
a second acquiring unit configured to acquire an optical property value of a first protective film that covers the first print;
a third acquiring unit configured to acquire a spectral distribution of a first light source, which serves as an observational light source for a first protective-film-covered print produced by covering the first print with the first protective film, and a spectral distribution of a second light source, which is either the same as or different from the first light source and which serves as an observational light source for the second print;
a first profile generator configured to generate a first profile corresponding to the first protective-film-covered print based on the acquired optical property value of the first print, the acquired optical property value of the first protective film, and the acquired spectral distribution of the first light source;
a second profile generator configured to generate a second profile corresponding to the second print based on the acquired optical property value of the second print and the acquired spectral distribution of the second light source; and
a color converter configured to convert colors of image data representing an image of the first print into colors of image data representing an image of the second print, using the generated first profile as an input profile and the generated second profile as an output profile.

* * * * *